(12) United States Patent
Bell et al.

(10) Patent No.: US 8,575,297 B2
(45) Date of Patent: Nov. 5, 2013

(54) SACRIFICIAL POLYMER COMPOSITIONS INCLUDING POLYCARBONATES HAVING REPEAT UNITS DERIVED FROM STEREOSPECIFIC POLYCYCLIC 2,3-DIOL MONOMERS

(75) Inventors: Andrew Bell, Lakewood, OH (US);
Robert A. Shick, Brecksville, OH (US);
Leah Langsdorf, Akron, OH (US);
Keitaro Seto, Brecksville, OH (US); W. C. Peter Tsang, Broadview Hts., OH (US)

(73) Assignee: Promerus, LCC, Brecksville, OH (US)

( * ) Notice: Subject to any disclaimer, the term of this patent is extended or adjusted under 35 U.S.C. 154(b) by 166 days.

(21) Appl. No.: 13/204,044

(22) Filed: Aug. 5, 2011

(65) Prior Publication Data

US 2012/0031556 A1 Feb. 9, 2012

Related U.S. Application Data

(60) Provisional application No. 61/371,489, filed on Aug. 6, 2010, provisional application No. 61/371,211, filed on Aug. 6, 2010.

(51) Int. Cl.
*C08G 64/00* (2006.01)
*C08G 63/02* (2006.01)
(52) U.S. Cl.
USPC ............... 528/196; 435/6; 435/14; 528/198

(58) Field of Classification Search
USPC ................................ 528/196, 198; 435/6.14
See application file for complete search history.

(56) References Cited

U.S. PATENT DOCUMENTS

| | | | | |
|---|---|---|---|---|
| 3,492,330 | A | * | 1/1970 | Lynn et al. ............... 560/354 |
| T896033 | I4 | | 3/1972 | Hamb et al. |
| 4,950,736 | A | | 8/1990 | Sasaki et al. |
| 7,157,025 | B2 | * | 1/2007 | Ichimura et al. ............ 252/582 |
| 8,329,840 | B2 | * | 12/2012 | Yoo et al. .................. 526/281 |
| 2004/0146803 | A1 | | 7/2004 | Kohl et al. |
| 2009/0294515 | A1 | | 12/2009 | Prack et al. |

FOREIGN PATENT DOCUMENTS

JP 5339355 12/1993

* cited by examiner

*Primary Examiner* — Terressa Boykin
(74) *Attorney, Agent, or Firm* — Balaram Gupta

(57) ABSTRACT

Embodiments according to the present invention relate to sacrificial polymer compositions that include polycarbonate polymers having repeat units derived from stereospecific polycyclic 2,3-diol monomers. The sacrificial polymer compositions also include an acid generator that is selected from at least one photoacid generator and/or at least one thermal acid generator. In addition, embodiments according to the present invention relate to a method of forming a structure that includes a three-dimensional space interposed between a substrate and an overcoat layer, and a method of temporarily bonding first and second substrates together, which make use of the polycarbonate polymers.

20 Claims, 3 Drawing Sheets

SACRIFICIAL POLYMER COMPOSITIONS INCLUDING POLYCARBONATES HAVING REPEAT UNITS DERIVED FROM STEREOSPECIFIC POLYCYCLIC 2,3-DIOL MONOMERS

CROSS-REFERENCE TO RELATED APPLICATION

This application is entitled to and claims priority to the U.S. Provisional Patent having Ser. No. 61/371,489, filed Aug. 6, 2010 and entitled "Sacrificial Polymer Compositions Including Polycarbonates Having Repeat Units Derived From Stereospecific Polycyclic 2,3-Diol Monomers"; as well as priority to the U.S. Provisional Patent having Ser. No. 61/371,211, filed Aug. 6, 2010 and entitled "Polymer Composition for Microelectronic Assembly". Both Provisional patents are incorporated herein by reference in their entirety.

TECHNICAL FIELD

Embodiments in accordance with the present invention relate generally to sacrificial polymer compositions that include polycarbonates having repeat units derived from stereospecific polycyclic 2,3-diol monomers and methods of using such compositions, and more specifically to compositions of polycarbonates that encompass repeat units derived from stereospecific norbornane-2,3-diol monomers and methods of using such compositions.

BACKGROUND

Sacrificial polymer compositions that include polycarbonates, such as, poly(propylene carbonate) are known. Typically such a sacrificial polymer composition can be applied to a substrate, patterned and overcoated with a non-sacrificial material. The overcoated, patterned sacrificial polymer composition can then be exposed to conditions of an elevated temperature sufficient to cause the sacrificial polymer to decompose and further cause decomposition products to pass through the non-sacrificial overcoat, thereby forming a defined enclosed space or air gap.

Sacrificial polymer compositions that include acyclic polycarbonates typically have glass transition temperature ($T_g$) values of less than 100° C., or less than or equal to 50° C. Such low $T_g$ values are generally accompanied by a combination of, desirably reduced temperatures at which the patterned sacrificial polymer composition is converted into a gaseous phase, and undesirably poor retention of pattern fidelity. The poor retention of pattern fidelity generally limits the extent to which photolithographic methods can be used to form the defined spaces, such as, enclosed microchannels. In the case of enclosed microchannels, for example, poor retention of pattern fidelity can result in microchannels having low resolution and/or undesirable cross-sectional shapes.

U.S. Pat. No. 4,950,736 discloses polycarbonates that are prepared from bicyclol polycyclo dimethanols. The '736 patent does not disclose or suggest the stereochemistry of the bicyclol polycyclo dimethanols. The polycarbonates of the '736 patent are disclosed as having excellent thermal resistance.

It would be desirable to develop new polycarbonate polymers and sacrificial compositions containing such newly developed polycarbonate polymers, that provide a combination of desirable properties, such as $T_g$ values of greater than or equal to 50° C., reduced temperatures at which the patterned sacrificial polymer composition is converted into a gaseous phase, and improved retention of pattern fidelity. In addition, it would be desirable that such newly developed polycarbonate polymers and sacrificial compositions result in minimal residue formation after the polycarbonate polymer of the sacrificial polymer composition has been converted into a gaseous phase. It would be further desirable that such newly developed polycarbonate polymers and sacrificial compositions can be used for temporarily bonding substrates to one another.

DETAILED DESCRIPTION

Figure 1:
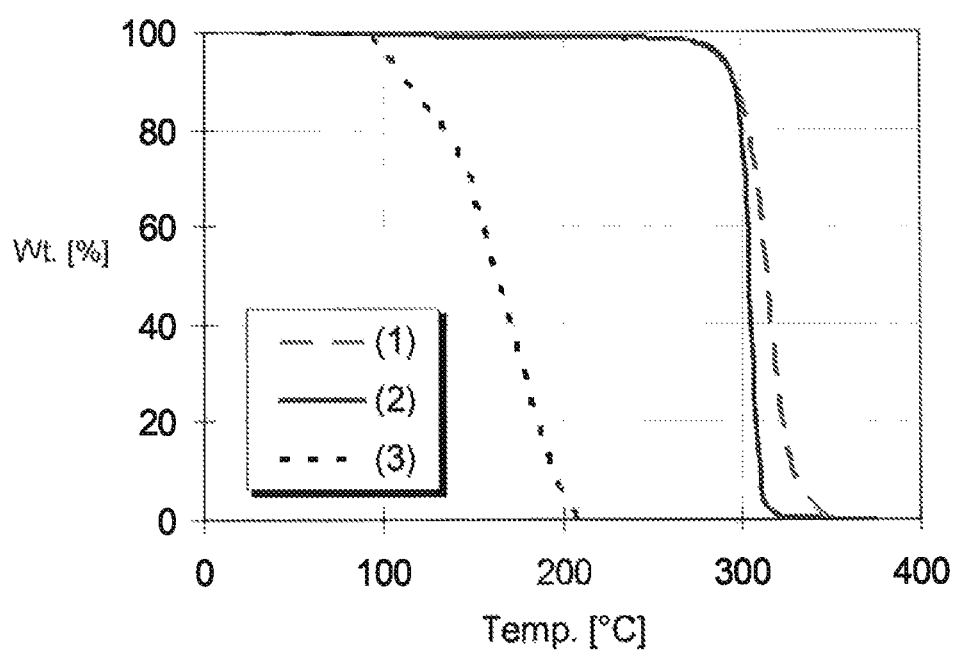
FIGS. 1 through 3 are graphical representations of the thermogravimetric analysis of embodiments of polycarbonate polymers and sacrificial compositions in accordance with the present invention, which are described in further detail in TGA Examples A, B and C.

As used herein, the articles "a," "an," and "the" include plural referents unless otherwise expressly and unequivocally limited to one referent.

As used herein, the term "photoacid generator" and similar terms, such as, "photo-catalyzed acid generator" and "photoinitiator" means a material that generates one or more acids, including but not limited to protonic acids, after exposure to appropriate "actinic radiation".

As used herein, the terms "group" or "groups" when used in relation to a chemical compound and/or representative chemical structure/formula, mean an arrangement of one or more atoms.

As used herein, the terms "norbornane-2,3-diol" or "2,3-norbornane diol" are used interchangeably and refer to both monomers and repeating units in accordance with any of Formulae A, A1, B, B1, C, C1, D, D1, D1', E, E1, E1', F, F1, F1', G, D-DU-1 and D-DU-2. In some embodiments in accordance with the present invention, such 2,3-norbornane diols have an odd number of carbons atoms between the two hydroxyl groups.

As used herein, molecular weight values of polymers, such as weight average molecular weights ($M_w$) and number average molecular weights ($M_n$), are determined by gel permeation chromatography using polystyrene standards.

As used herein, polydispersity index (PDI) values represent a ratio of the weight average molecular weight ($M_w$) to the number average molecular weight ($M_n$) of the polymer (i.e., $M_w/M_n$).

As used herein, and unless otherwise stated, polymer glass transition temperature ($T_g$) values are determined by differential scanning calorimetry, in accordance with American Society for Testing and Materials (ASTM) method number D3418.

As used herein, the term "thermal acid generator" and similar terms, such as, "thermal-catalyzed acid generator" means a material that generates one or more acids, including but not limited to protonic acids, after exposure to an appropriate elevated temperature.

Unless otherwise indicated, all ranges or ratios disclosed herein are to be understood to encompass any and all subranges or subratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to, 1 to 6.1, 3.5 to 7.8, and 5.5 to 10.

Other than in the operating examples, or where otherwise indicated, all numbers expressing quantities of ingredients, reaction conditions, and so forth used in the specification and claims are to be understood as being modified in all instances by the term "about" to take into account the uncertainties associated with determining such values.

The features that characterize embodiments of the present invention are pointed out with particularity in the claims, which are annexed to and form a part of this disclosure. These and other features of such embodiments, their operating advantages and uses will be more fully understood from the description of such embodiments herein below.

Some embodiments in accordance with the present invention provide polycarbonate polymers that encompass repeating units derived from at least one polycyclic 2,3-diol monomer represented by and selected from the following Formulae A, B or C:

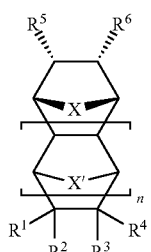

A

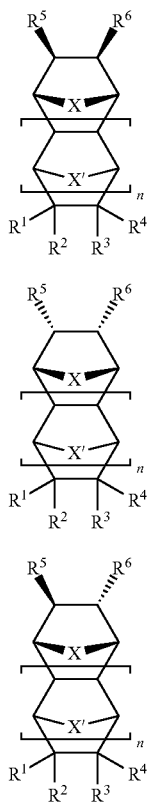

B

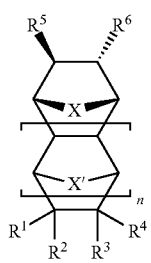

C

For each monomer represented by Formulae A, B and C, n is independently 0, 1 or 2, each of $R^1$, $R^2$, $R^3$ and $R^4$ is independently selected from hydrogen or a hydrocarbyl group containing, without limitation, from 1 to 25 carbon atoms, each of $R^5$ and $R^6$ are independently selected from —$(CH_2)_p$—OH, where p is 0, 1, 2 or 3, and each of X and X' is independently selected from —$CH_2$—, —$CH_2$—$CH_2$— and —O—, where each X' is, if present, oriented the same or opposite the orientation of X. For some embodiments in accordance with the present invention, p is 1, 2 or 3 for at least one of $R^5$ and $R^6$.

In accordance with embodiments of the present invention, there is further provided a polycarbonate polymer as described above. Polycarbonate polymer embodiments according to the present invention encompass repeating units that are derived from at least one polycyclic 2,3-diol monomer selected from and represented by one or more of Formulae A, B or C as described and depicted above. For each of Formulae A, B and C, $R^1$-$R^4$ are in each case independently selected from hydrogen or a hydrocarbyl group, which can include from 1 to 25 carbon atoms, and which can also be referred to herein as a $C_1$-$C_{25}$ hydrocarbyl group.

As used herein the term "hydrocarbyl" and similar terms, such as "hydrocarbyl group" means a radical of a group that contains carbon and optionally hydrogen, non-limiting examples being alkyl, cycloalkyl, aryl, aralkyl, alkaryl, alkenyl, cycloalkenyl, polycycloalkenyl, alkynyl, cycloalkynyl and polycycloalkynyl. The term "halohydrocarbyl" as used herein means a hydrocarbyl group where at least one hydrogen covalently bonded to a carbon has been replaced by a halogen. The term "perhalocarbyl" as used herein means a hydrocarbyl group where all such hydrogens have been replaced by a halogen. In addition, the term "heterohydrocarbyl" as used herein means a hydrocarbyl group where at least one carbon atom has been replaced with a hetero atom such as oxygen, nitrogen and/or sulfur.

As used herein, the term "alkyl" means a linear or branched acyclic or cyclic, saturated hydrocarbon group having a carbon chain length of from $C_1$ to $C_{25}$. Nonlimiting examples of suitable alkyl groups include methyl, ethyl, propyl, isopropyl, butyl, isobutyl, sec-butyl, tert-butyl, pentyl, neopentyl, hexyl, heptyl, octyl, nonyl, decyl, undecyl, dodecyl, tridecyl, tetradecyl, pentadecyl, hexadecyl, heptadecyl, octadecyl, nonadecyl, isocanyl, cyclopropyl, cyclobutyl, cyclopentyl, cyclohexyl, cycloheptyl and cyclooctyl. As used herein, the term "heterocycloalkyl" means a cycloalkyl group in which one or more carbons of the cyclic ring has been replaced with a hetero atom, such as oxygen, nitrogen and/or sulfur. Representative heterocycloalkyl groups include but are not limited to tetrahydrofuranyl, tetrahydropyranyl, morpholinyl, and piperidinyl.

As used herein, the term "aryl" means aromatic groups that include, without limitation, phenyl, biphenyl, benzyl, xylyl, naphthalenyl, anthracenyl, As used herein, the term "heteroaryl" means an aryl group in which one or more carbons of the aromatic ring or rings has been replaced with a hetero atom, such as oxygen, nitrogen and/or sulfur. Representative heteroaryl groups include but are not limited to furanyl, pyranyl and pyridinyl.

The terms "alkaryl" and "aralkyl" are used herein interchangeably and mean a linear or branched acyclic alkyl group substituted with at least one aryl group, for example, phenyl, and having an alkyl carbon chain length of $C_1$ to $C_{25}$. It will further be understood that the above acyclic alkyl group can be a haloalkyl or perhaloalkyl group.

As used herein, the term "alkenyl" means a linear or branched acyclic or cyclic hydrocarbon group having one or more double bonds and having an alkenyl carbon chain length of $C_2$ to $C_{25}$. Non-limiting examples of alkenyl groups include, among others, vinyl, allyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, and isocenyl.

As used herein, the term "alkynyl" means a linear or branched acyclic or cyclic hydrocarbon group having one or more carbon-carbon triple bonds and having an alkynyl carbon chain length of $C_2$ to $C_{25}$. Representative alkynyl groups, include but are not limited to, ethynyl, 1-propynyl, 2-propynyl, 1-butynyl, 2-butynyl, pentynyl, heptynyl, octynyl, nonynyl, decynyl, undecynyl, dodecynyl, tridecynyl, tetradecynyl, pentadecynyl, hexadecynyl, heptadecynyl, octadecynyl, nonadecynyl, isocynyl.

As used herein, recitations of "linear or branched" groups, such as linear or branched alkyl, will be understood to include a methylene group, groups that are linear, such as linear $C_2$-$C_{25}$ alkyl groups, and groups that are appropriately branched, such as branched $C_3$-$C_{25}$ alkyl groups.

For Formulae A, B and C, each X group is depicted as extending upward out of the page. With Formula A, $R^5$ and $R^6$ are each depicted as extending upward out of the page, and as such are cis- to one another and are exo-relative to the X group. Formula A, therefore is referred to as a polycyclic cis-exo 2,3-diol monomer. With Formula B, $R^5$ and $R^6$ are each depicted as extending downward into the page, and as such are cis- to one another and are endo-relative to the X group. Formula B, therefore, is referred to as a polycyclic cis-endo 2,3-diol monomer. With Formula C, $R^5$ is depicted as extending upward out of the page, exo-relative to the X group, $R^6$ is depicted as extending downward into the page, endo-relative to the X group, and trans-relative to one another. Formula C, therefore, is referred to as a polycyclic endo/exo 2,3-diol monomer or a polycyclic trans 2,3-diol monomer.

Some of the polycarbonate polymer embodiments as described above can encompass repeating units derived from polycyclic 2,3-diols selected from each of Formulae A, B and C or selected from any one or two of such formulae.

When such a polycarbonate polymer embodiments encompass repeating units derived from two polycyclic 2,3-diol monomers represented by and selected from Formula A, Formula B and Formula C, the mole percent ratio of such repeating units can be from 1 to 99, from 10 to 90, from 30 to 70, or any other subratio subsumed in any of such recited ratios, provided that the sum of mole percents of such repeating units is 100 mole percent.

Some of the polycarbonate polymer embodiments of the present invention encompass monomers represented by and selected from each of Formula A, Formula B and Formula C. Such embodiments will be understood to include mole percent ratios where any single mole percent is 1, any single mole percent is 98 as well as any other subratio subsumed therein. Without limitation, such mole percent ratios include, 1 to 1 to 98, 10 to 10 to 80, and 33.33 to 33.33 to 33.33, provided that the sum of mole percents of such repeating units is 100 mole percent.

For some polycarbonate polymer embodiments in accordance with the present invention, $R^5$ and $R^6$ of each of Formulae A, B and C, can be independently selected from —$(CH_2)_p$—OH, where p is 0, 1, 2 or 3. While for other such embodiments, for at least one of $R^5$ and $R^6$, p is independently 1, 2 or 3, for example providing —$CH_2OH$ where p is 1. In still other such embodiments, for each of $R^5$ and $R^6$, p is independently 1, 2 or 3.

Some polycarbonate polymer embodiments of the present invention, encompass repeating units derived from one or more polycyclic 2,3-diol monomers represented by and selected only from monomers represented by Formula A and/or Formula B. For example, such embodiments can encompass repeating units derived from two or more monomers independently selected from Formula A alone, Formula B alone, or a combination of Formula A and Formula B. Further, for some of such embodiments $R^5$ and $R^6$ are in each case independently selected from —$(CH_2)_p$—OH, where p is 1, 2 or 3. When the polycyclic 2,3-diol monomer is selected from both Formula A and Formula B, the repeat units derived from Formula A and Formula B can each be present, without limitation, in an amount independently of from 1 to 99 mole percent, or 5 to 95 mole percent, or 10 to 90 mole percent, based on the total moles of repeating units derived from such polycyclic 2,3-diol monomers represented by Formula A and Formula B, provided that the sum of mole percents of repeating units derived from such polycyclic 2,3-diol monomers is 100 mole percent.

For some polycarbonate embodiments according to the present invention, the repeating units can be derived from one or more polycyclic 2,3-diol monomers represented by and selected from Formula C alone. For such further embodiments, when the polycyclic 2,3-diol monomer is selected from Formula C alone at least one of $R^1$-$R^4$ is selected from hydrocarbyl. The hydrocarbyl groups from which each of $R^1$-$R^4$ can be independently selected include, but are not limited, those classes and examples as recited previously herein. With further embodiments, when the polycyclic 2,3-diol monomer is selected from Formula C alone, $R^5$ and $R^6$ are in each case independently selected from —$(CH_2)_p$—OH, where p is 1, 2 or 3.

For each of Formula A, Formula B and Formula C, with embodiments of the present invention, at least one of $R^1$-$R^4$ is a group independently selected from alkyl, cycloalkyl, heteroalkyl, heterocycloalkyl, aryl, heteroaryl and aralkyl, and the others of $R^1$-$R^4$, if any, that are not selected from such non-hydrogen groups, are each hydrogen. Examples of alkyl, cycloalkyl, heteroalkyl, heterocycloalkyl, aryl, heteroaryl and aralkyl groups from which each of $R^1$-$R^4$ can be selected include, but are not limited to, those classes and examples as recited previously herein, which can optionally include one or more further substituents, such as, but not limited to: halohydrocarbyl substituents, such as but not limited to $C_1$-$C_{25}$ linear or branched perfluoro alkyl groups, such as but not limited to, —$CF_3$; carboxylic acid esters, such as but not limited to —COOR', where R' is a hydrocarbyl group; and ether groups, such as but not limited to —OR", where R" is a hydrocarbyl group.

For further embodiments of the present invention, for each of Formulae A, B and C: n is 0; three of $R^1$-$R^4$, are each hydrogen; and one of $R^1$-$R^4$ is independently selected from alkyl, cycloalkyl, heteroalkyl, heterocycloalkyl, aryl, heteroaryl and aralkyl, and is oriented exo relative to X. For purposes of illustration, with n=0, X being —$CH_2$—, $R^1$, $R^2$ and $R^3$ each being hydrogen, $R^4$ being a non-hydrogen exo group relative to X, and $R^5$ and $R^6$ each being —$CH_2OH$, Formulae A, B and C can be represented by the following Formulae A1, B1 and C1.

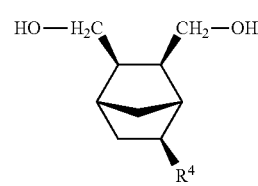

A1

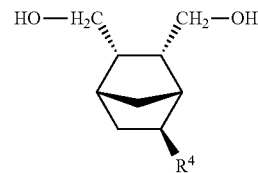

B1

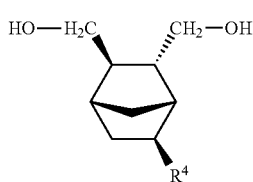

C1

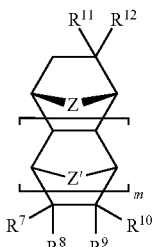

D

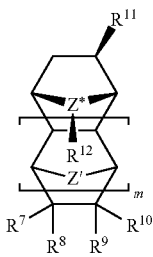

E

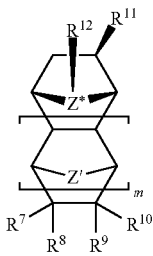

F

For each of Formulae A1, B1 and C1, $R^4$ can in each case be independently selected from a hydrocarbyl group including, but not limited to those classes and examples as described previously herein, for example, with regard to $R^1$-$R^4$.

For some polycarbonate polymer embodiments according to the present invention, the polycarbonate polymer encompasses repeat units derived from: (a) polycyclic 2,3-diol monomers represented by one or more of Formulae A, B and/or C; and (b) one or more further diol monomers that are other than polycyclic 2,3-diol monomers represented by Formulae A, B and C. Such further diol monomers, as will be described further herein, include, but are not limited to: (i) polycyclic diol monomers represented by at least one of Formulae D, E, F and G; (ii) cyclic diol monomers represented by at least one of Formulae I-XII; (iii) polycyclic diol monomers represented by at least one of Formulae XIVa-XIVb; (iv) further optional diol monomers, such as hydrocarbyls having two or more hydroxyl groups; and combinations thereof.

For polycarbonate polymer embodiments according to the present invention, which encompass repeat units derived from one or more polycyclic 2,3-diol monomers (a), and one or more further diols (b), repeat units derived from polycyclic 2,3-diol monomers (a) can be present in an amount of from 1 to 99 mole percent, or 5 to 95 mole percent, or 10 to 90 mole percent; and repeat units derived from further diols (b) can be present in amounts and ranges as describe for (a). The mole percents in each case being based on the total moles of repeating units derived from polycyclic 2,3-diol monomers (a), and further diols (b), provided that the sum of mole percents of repeating units derived from polycyclic 2,3-diol monomers (a) and further diols (b) is 100 mole percent.

Such further diols (b) can be used for purposes of modifying the physical properties of the resulting polycarbonate polymer. For example, such further diols (b) can provide the resulting polycarbonate polymer with weak links, that render the polycarbonate polymer more susceptible to depolymerization in the presence of an acid, such as, a protonic acid. Alternatively, or in addition to providing weak links, such further diols (b) can modify the $T_g$ of the resulting polycarbonate polymer, such as decreasing or increasing the $T_g$ thereof. However, such further diols can also modify the carrier solvent compatibility of the polymer, increasing or decreasing the solubility of a polymer to which the further diols were incorporated. Further still, it should be realized that such further diols can also modify adhesive properties of the resulting polycarbonate polymer.

Optional further diol monomers, include polycyclic diol monomers represented by the following Formulae D, E and F.

Independently for each further polycyclic diol monomer represented by Formulae D, E and F: m is 0, 1 or 2; Z and Z' are each independently selected from —$CH_2$—, —$CH_2$—$CH_2$— and —O—; Z* is —CH—; $R^7$, $R^8$, $R^9$ and $R^{10}$ are in each case independently selected from hydrogen, and a hydrocarbyl group; $R^{11}$ and $R^{12}$ are in each case independently selected from —$(CH_2)_p$—OH, where p for $R^{11}$ and $R^{12}$ is in each case independently selected from 0, 1, 2 or 3; and each Z' is, if present, oriented the same or opposite the orientation of Z or Z*, respectively.

With Formulae D, E and F, each Z group and Z* group is depicted as extending upward out of the page. With Formula D, each Z', if present, has an orientation, independently for each m, that is the same or opposite relative to the orientation of Z. With Formulae E and F, each Z', if present, has an orientation, independently for each m, that is the same or opposite relative to the orientation of Z*.

The hydrocarbyl groups from which $R^7$-$R^{10}$ can each be independently selected include, but are not limited to, those classes and examples recited previously herein. For each of Formulae D-F, in embodiments of the present invention, at least one of $R^7$-$R^{10}$ is a group independently selected from alkyl, cycloalkyl, heteroalkyl, heterocycloalkyl, aryl, heteroaryl and aralkyl, and the other $R^7$-$R^{10}$ group(s), if any, that are not selected from such non-hydrogen groups, are each hydrogen. Examples of alkyl, cycloalkyl, heteroalkyl, heterocycloalkyl, aryl, heteroaryl and aralkyl groups from which each of $R^7$-$R^{10}$ can be selected include, but are not limited to, those classes and examples as recited previously herein with regard to $R^1$-$R^4$.

In further embodiments, for each of Formulae D-F: m is 0; three of $R^7$-$R^{10}$ are each hydrogen; and one of $R^7$-$R^{10}$ is independently selected from alkyl, cycloalkyl, heteroalkyl, heterocycloalkyl, aryl, heteroaryl and aralkyl, and is oriented exo relative to Z or Z*. For purposes of illustration, with m=0, Z being —CH$_2$—, $R^7$, $R^8$ and $R^9$ each being hydrogen, $R^{10}$ being a non-hydrogen exo group, $R^{11}$ and $R^{12}$ each being —CH$_2$OH for Formula D and —OH for Formulae E and F, Formulae D-F can be represented by the following Formulae D1, E1 and F1. For purposes of further illustration, with m=0, Z being —CH$_2$—, $R^8$, $R^9$ and $R^{10}$ each being hydrogen, $R^7$ being a non-hydrogen exo group, $R^{11}$ and $R^{12}$ each being —CH$_2$OH for Formula D and —OH for Formulae E and F, Formulae D-F can be represented by the following Formulae D1', E1' and F1'. It will be understood, that unless specifically stated, all Formulae presented herein are inclusive of the enantiomeric, and diasteriomeric analogs thereof.

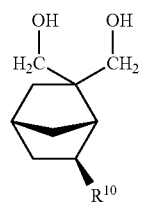

D1

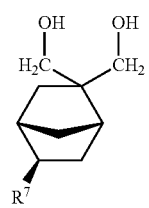

D1'

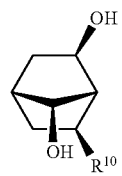

E1

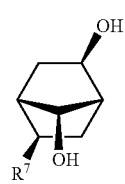

E1'

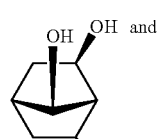

F1

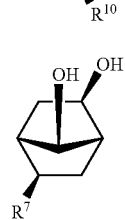

F1'

Optional further diol monomers, include polycyclic diol monomers represented by the following Formula G.

G

With the polycyclic diol represented by Formula G, Z, $R^{11}$ and $R^{12}$ are each as described previously herein with regard to Formulae E-F.

Optional further diol monomers, include cyclic diol monomers represented by the following Formulae I through XII.

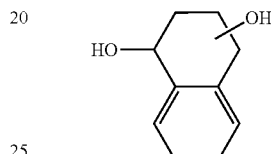

I

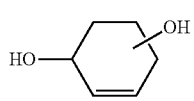

II

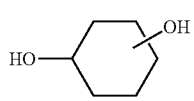

III

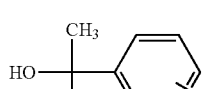

IV

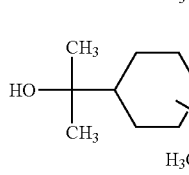

V

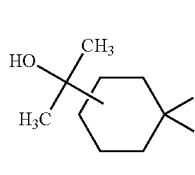

VI

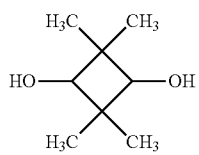

VII

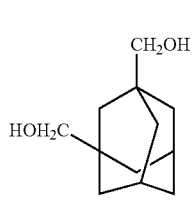

VIII

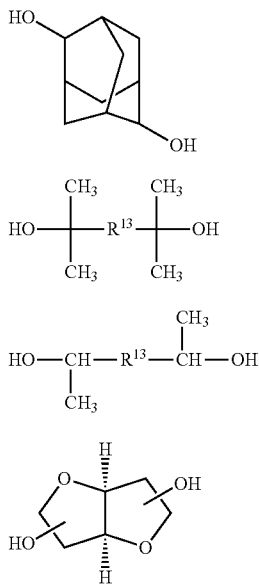

With Formulae X and XII, $R^{13}$ is independently selected from $C_1$-$C_6$ alkyl, such as but not limited to $C_1$-$C_6$ linear alkyl or $C_3$-$C_6$ branched alkyl.

Optional further diol monomers, include polycyclic diol monomers represented by the following Formulae XIVa, XIVb and XIVc.

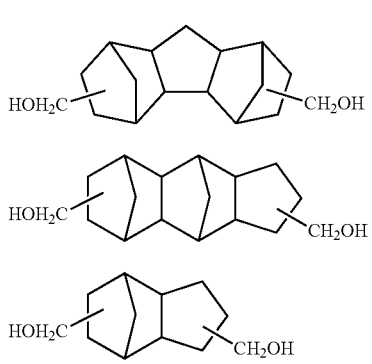

Further optional polyol monomers include, but are not limited to, hydrocarbyls having two or more hydroxyl groups, such as but not limited to 2, 3 or 4 hydroxyl groups. Examples of optional diol monomers include, but are not limited to: $C_1$-$C_{25}$ linear or branched alkylene diols, such as, 1,2-ethylenediol, 1,3-propylenediol and 1,2-propylenediol; and polyalkyleneglycols, such as di-, tri-, tetra- and higher ethyleneglycols, di-, tri, tetra- and higher propyleneglycols. Optional polyol monomers having more than two hydroxyl groups are typically present in small amounts, such as but not limited to less than 10 mole percent, or less than 5 mole percent, based on the total mole percent of hydroxyl functional monomers. Examples of polyol monomers having more than two hydroxyl groups include, but are not limited to, trimethylolpropane, pentaerythritol and di-trimethylolpropzine. For some embodiments, the polycarbonate polymer is not derived from polyol monomers having more than two hydroxyl groups.

The polycyclic 2,3-diol monomers represented by Formulae A, B and C can be prepared by art-recognized methods. For purposes of non-limiting illustration, the polycyclic cis-exo 2,3-diol monomer represented by Formula A can be prepared in accordance with the following Synthetic Scheme 1, in which n is 0, $R^1$-$R^4$ are each hydrogen, X is —$CH_2$—, and $R^5$ and $R^6$ are each —$CH_2OH$.

Synthetic Scheme 1

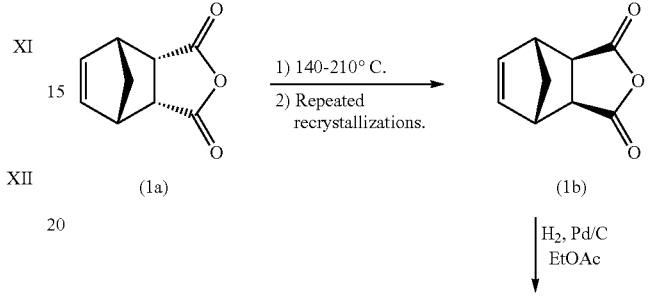

With reference to Synthetic Scheme 1, endo-2,3-norbornene dicarboxylic acid anhydride (also referred to as endo-nadic anhydride) (1a) is exposed to a temperature of 140 to 210° C. for a sufficient period of time, such as from 15 minutes after melting to 24 hours, followed by repeated recrystallizations, such as 2 or more recrystallizations from ethyl acetate or toluene, so as to form exo-2,3-norbornene dicarboxylic acid anhydride (also referred to as exo-nadic anhydride) (1b). Hydrogenation of cis-exo-nadic anhydride (1b) in the presence of hydrogen gas ($H_2$), palladium catalyst supported on porous carbon (Pd/C), and ethyl acetate (EtOAc), results in formation of exo-2,3-norbornane dicarboxylic acid anhydride (1c). Reduction of exo-2,3-norbornane dicarboxylic acid anhydride (1c) in the presence of lithium aluminum hydride (LiAlH$_4$) and ethyl ether (Et$_2$O) results in formation of cis-exo-2,3-norbornanedimethanol (A2).

For purposes of further non-limiting illustration, the polycyclic cis-endo 2,3-diol monomer represented by Formula B can be prepared in accordance with the following Synthetic Scheme 2, in which n is 0, $R^1$-$R^4$ are each hydrogen, X is —$CH_2$—, and $R^5$ and $R^6$ are each —$CH_2OH$.

Synthetic Scheme 2

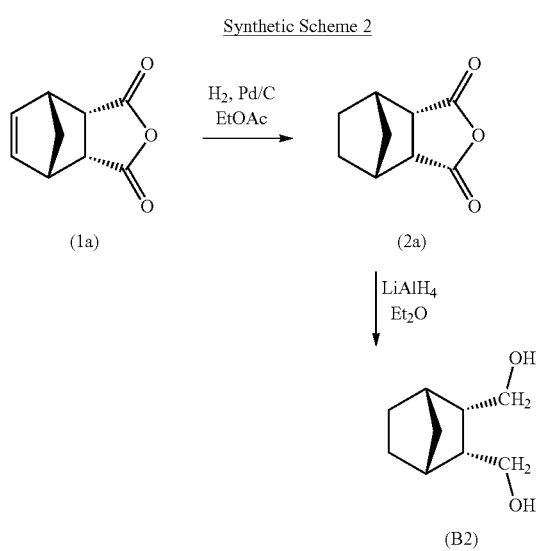

With reference to Synthetic Scheme 2, cis-endo-2,3-norbornene dicarboxylic acid anhydride (also referred to as endo-nadic anhydride) (1a) is hydrogenated in the presence of hydrogen gas ($H_2$), palladium catalyst supported on porous carbon (Pd/C), and ethyl acetate (EtOAc), results in formation of endo-2,3-norbornane dicarboxylic acid anhydride (2a). Reduction of endo-2,3-norbornane dicarboxylic acid anhydride (2a) in the presence of lithium aluminum hydride ($LiAlH_4$) and ethyl ether ($Et_2O$) results in formation of cis-endo-2,3-norbornanedimethanol (B2).

The polycyclic endo-exo-2,3-diol monomer represented by Formula C can be prepared in accordance with the following Synthetic Scheme 3, which is provided for purposes of non-limiting illustration, in which n is 0, $R^1$-$R^4$ are each hydrogen, X is —$CH_2$—, and $R^5$ and $R^6$ are each —$CH_2OH$.

Synthetic Scheme 3

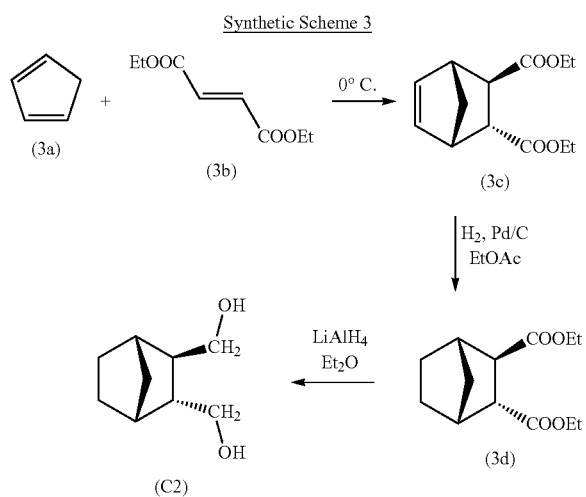

With reference to Synthetic Scheme 3, cyclopentadiene (3a) and diethyl fumarate (3b) are reacted together by means of Diels-Alder reaction at reduced temperature, such as 0° C., so as to form endo-exo-2,3-norbornene bis(ethylcarboxylate) (3c). Hydrogenation of endo-exo-2,3-norbornene bis(ethylcarboxylate) (3c) in the presence of hydrogen gas ($H_2$), palladium catalyst on porous carbon (Pd/C), and ethyl acetate (EtOAc), results in formation of endo-exo-2,3-norbornane bis(ethylcarboxylate) (3d). Reduction of endo-exo-2,3-norbornane bis(ethylcarboxylate) (3d) in the presence of lithium aluminum hydride ($LiAlH_4$) and ethyl ether ($Et_2O$) results in formation of exo-endo-2,3-norbornanedimethanol (C2).

The polycyclic cis-exo-2,3-diol monomer represented by Formula A can be prepared in accordance with the following Synthetic Scheme 4, which is provided for purposes of non-limiting illustration, in which n is 0, $R^1$-$R^4$ are each hydrogen, X is —$CH_2$—, $R^5$ is —OH and $R^6$ is —$CH_2OH$.

Synthetic Scheme 4

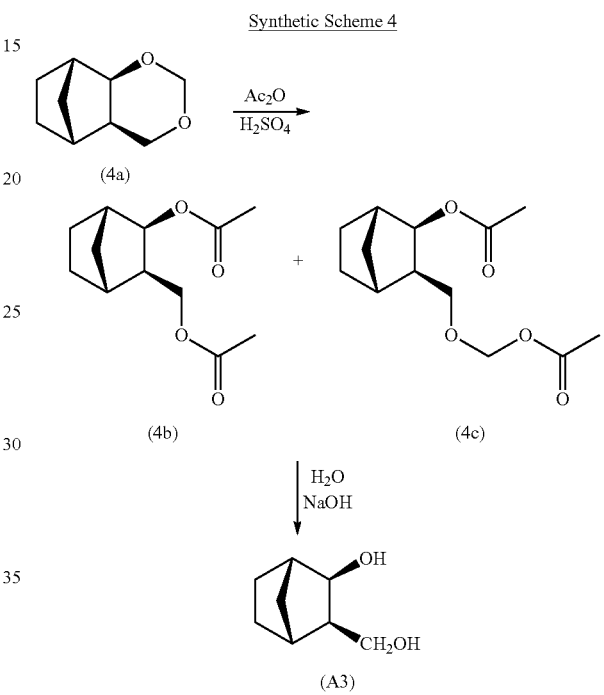

With reference to Synthetic Scheme 4, hexahydro-4H-5,8-methanobenzo[d]-exo-[1,3]dioxane (4a) is converted to cis-exo-(3-acetoxynorborn-2-yl)methyl acetate (4b) and cis-exo-((3-acetoxynorborn-2-yl)methoxy)methyl acetate (4c) in the presence of acetic anhydride ($Ac_2O$) and a catalytic amount of sulfuric acid ($H_2SO_4$). The intermediates (4a) and (4b) are converted to cis-exo-3-(hydroxymethyl)norbornan-2-yl (A3) in the presence of water and a catalytic amount of sodium hydroxide (NaOH).

The polycyclic cis-endo-2,3-diol monomer represented by Formula B can be prepared in accordance with the following Synthetic Scheme 5, which is provided for purposes of non-limiting illustration, in which n is 0, $R^1$-$R^4$ are each hydrogen, X is —$CH_2$—, $R^5$ is —OH and $R^6$ is —$CH_2OH$.

Synthetic Scheme 5

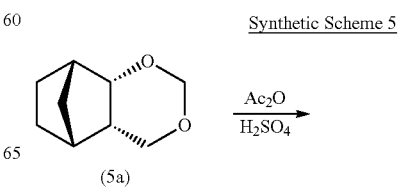

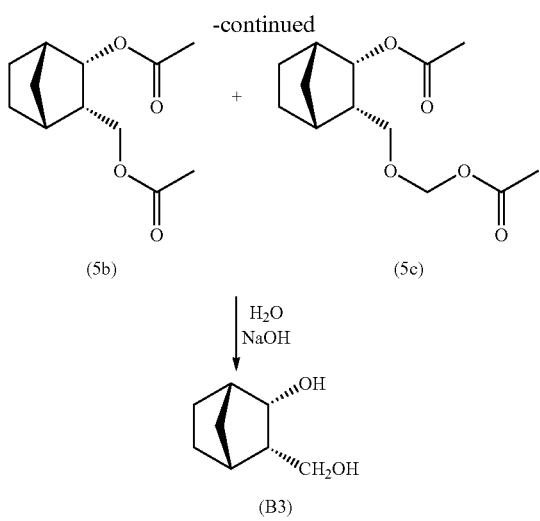

(5b)  (5c)

(B3)

With reference to Synthetic Scheme 5, hexahydro-4H-5,8-methanobenzo[d]-endo-[1,3]dioxane (5a) is converted to cis-endo-(3-acetoxynorborn-2yl)methyl acetate (5b) and cis-endo-((3-acetoxynorborn-2-yl)methoxy)methyl acetate (5c) in the presence of acetic anhydride ($Ac_2O$) and a catalytic amount of sulfuric acid ($H_2SO_4$). The intermediates (5a) and (5b) are converted to cis-endo-3-(hydroxymethyl)norbornan-2-yl (B3) in the presence of water and a catalytic amount of sodium hydroxide (NaOH).

The optional polycyclic diols represented by Formulae D, E, F and G can be prepared by art-recognized methods. For purposes of non-limiting illustration, the optional polycyclic diol represented by Formula F can be synthesized in accordance with the following Synthetic Scheme 6, where m is 0, $R^7$-$R^{10}$ are each hydrogen, Z is —$CH_2$—, $R^{11}$ is —OH and $R^{12}$ is —$CH_2OH$.

Synthetic Scheme 6

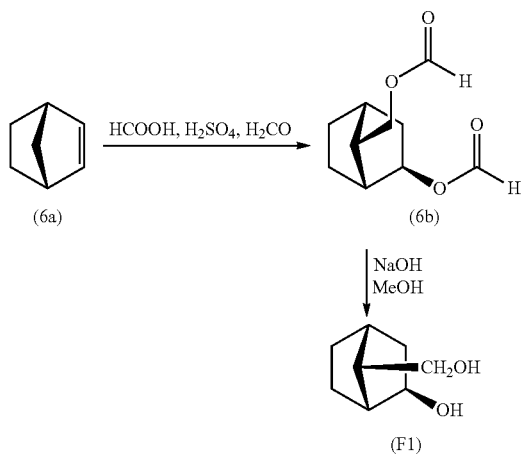

(6a)  (6b)

(F1)

With reference to Synthetic Scheme 6, 2,3-norbornene (6a) is converted to (2-(formyloxy)norborn-7-yl)-exo-methyl formate (6b) in the presence of formic acid (HCOOH) sulfuric acid ($H_2SO_4$) and formaldehyde ($H_2CO$). Intermediate (6b) is then converted to 7-(hydroxymethyl)norbornan-2-exo-ol (F1) in the presence of sodium hydroxide (NaOH) and methanol (MeOH).

Polycarbonate polymer embodiments according to the present invention can be prepared by art-recognized methods. For example, the polycarbonate polymers according to embodiments of the present invention can be prepared by a carbonyl halide route, in which one or more polycyclic 2,3-diol monomers represented by Formulae A, B or C are reacted with a carbonyl halide, $X_2C$=O, in which each X is selected independently from a halo group. An example of a carbonyl halide includes, but is not limited to, phosgene, where each X is chloro (Cl). Alternatively, for polycarbonate polymer embodiments according to the present invention a carbonyl diimidazole route can be used, in which one or more polycyclic 2,3-diol monomers represented by Formulae A, B or C are reacted with N,N-carbonyldiimidazole.

Typically, for polycarbonate polymer embodiments according to the present invention a carbonate route can be used, in which one or more polycyclic 2,3-diol monomers represented by Formulae A, B or C are reacted with a dialkyl carbonate, such as diethyl carbonate, a diaryl carbonate, such as diphenyl carbonate, and/or an alkyl-aryl carbonate. For purposes of non-limiting illustration of embodiments in accordance with the present invention, a polycarbonate polymer can be prepared in accordance with the following Synthetic Scheme 7.

Synthetic Scheme 7

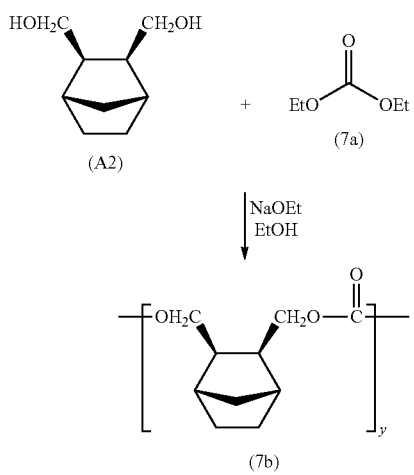

(A2)  (7a)

(7b)

With reference to Synthetic Scheme 7, cis-exo-2,3-norbornanedimethanol monomer (A2) is reacted with diethylcarbonate (7a) in the presence of sodium ethoxide (NaOEt) and ethanol (EtOH), which results in formation of poly(cis-exo-2,3-norbornanedimethanol) (7b), in which y is the number of repeat units. The cis-exo-2,3-norbornanedimethanol monomer (A2), is a polycyclic 2,3-diol monomer according to Formula A, in which n is 0, $R^1$-$R^4$ are each hydrogen, X is —$CH_2$—, and $R^5$ and $R^6$ are each —$CH_2OH$.

For polycarbonate polymer embodiments according to the present invention, the polycarbonate polymers can be selected from homopolymers, such as homopolymers containing a single type of repeating unit derived from one of Formulae A, B or C, or random copolymers, or block copolymers, or alternating copolymers, which are alternatively referred to herein as random polymers, block polymers and alternating polymers. The random, block and alternating polycarbonate copolymer embodiments according to the present invention can include two or more types of repeating units derived from at least one of Formulae A, B or C.

For some embodiments according to the present invention, the polycarbonate polymers can have a wide range of molecular weights. For some embodiments, for example, the polycarbonate polymers can have: weight average molecular weight ($M_w$) values of from 2000 to 250,000, or from 8000 to 100,000, or from 9000 to 60,000.

For some embodiments according to the present invention, the polycarbonate polymers can have a wide range of glass transition temperature ($T_g$) values, such as but not limited to, $T_g$ values of from 0° C. to 200° C., or from 50° C. to 180° C., or from 60° C. to 175° C.

For some embodiments according to the present invention, the polycarbonate polymers can be characterized with regard to the temperature at which the polymer vaporizes, which can also be referred to as a vaporization temperature or degradation temperature or a decomposition temperature. For some embodiments, the vaporization temperature of the polycarbonate polymers can be quantified with regard to the 5 percent ($T_{d5}$), 50 percent ($T_{d50}$) and 95 percent ($T_{d95}$) decomposition temperature thereof. Such values being the temperatures at which 5, 50 and 95 percent weight loss is observed. Such decomposition temperatures are typically determined by means of thermogravimetric analysis (TGA) and can be determined for the polymer alone, for the polymer in the presence of a photoacid generator before or after its activation or for the polymer in the presence of a thermal acid generator, generally after its activation.

Embodiments in accordance with the present invention also provide sacrificial polymer compositions that encompass: one or more polycarbonate polymers as described previously herein; and an acid generator selected from at least one photoacid generator (PAG) and/or at least one thermal acid generator (TAG). The sacrificial polymer composition embodiments according to the present invention, can encompass a single polycarbonate polymer or two or more polycarbonate polymer embodiments according to the present invention.

For embodiments of the present invention, the sacrificial polymer composition can encompass a combination of polycarbonate polymer embodiments according to the invention. The sacrificial polymer composition can encompass: a first polycarbonate polymer that encompasses repeating units derived from polycyclic 2,3-diol monomers represented by both of Formulae A and B; and a second polycarbonate polymer that encompasses repeating units derived from polycyclic 2,3-diol monomers represented by Formula C.

Photoacid generators used in the sacrificial composition embodiments according to the present invention, generate an acid, such as but not limited to a protonic acid, after exposure to actinic light, such as but not limited to ultraviolet light, and/or elevated temperature, such as but not limited to temperatures of at least 100° C. Thermal acid generators used in sacrificial composition embodiments according to the present invention, generate an acid, such as but not limited to a protonic acid, after exposure to elevated temperature, such as but not limited to, temperatures of at least 100° C. With some embodiments, the thermal acid generator is selected from thermal acid generators that are also photoactive, such as but not limited to photoacid generators. With some embodiments, the thermal acid generator is selected from thermal acid generators that are not photoactive, such as but not limited to thermal acid generators that are not photoacid generators.

Photoacid generators and thermal acid generators, that can be included in sacrificial polymer composition embodiments according to the present invention, generate one or more acids that result in depolymerization, such as but not limited to catalytic depolymerization, of the polycarbonate polymer embodiments according to the present invention. As used herein, the term "depolymerization" means the polycarbonate polymer is at least partially broken down into smaller units each having a molecular weight less than the molecular weight of the polycarbonate polymer prior to depolymerization. Such depolymerized units, generally having properties distinct from those of the polymers before depolymerization, include but are not limited to: the monomers from which the polymer was derived; polycarbonate oligomers; hydroxyl-terminated polycyclic carbonate oligomers; polycyclic carbonates; polycyclic ethers; cyclic carbonates; and/or gasses, such as but not limited to CO and/or $CO_2$.

For purposes of nonlimiting illustration, the depolymerization of a polycarbonate or polycarbonate segment derived from a polycyclic 2,3-diol represented by Formula A, in which n is 0, X is —$CH_2$—, and $R^1$-$R^4$ are each hydrogen, so as to form polycyclic carbonates containing at least one carbonate linkage in the polycyclic ring, and/or polycyclic ethers containing at least one ether linkage in the polycyclic ring, is represented by the following Scheme 8. In Scheme 8, the polycarbonate in the presence of an acid, such as a protonic acid, generated by a photoacid generator and/or a thermal acid generator, and optionally with elevated temperature, results in at least partial depolymerization of the polycarbonate.

Synthetic Scheme 8

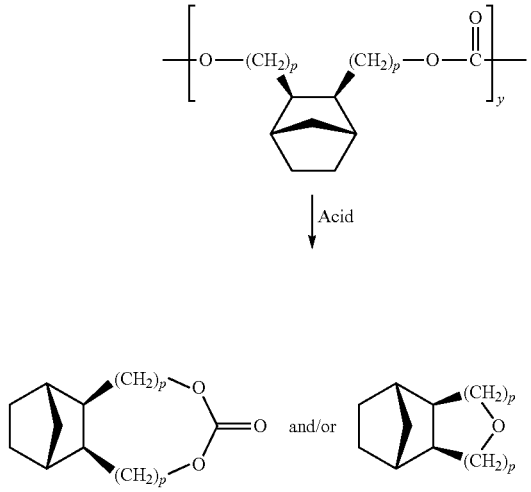

The polycyclic carbonates and/or polycyclic ethers depicted in Scheme 8 are vaporized by concurrent or subsequent application of elevated temperature, which is alternatively referred to herein as a vaporization temperature. For some embodiments of the present invention, the vaporized depolymerization units, such as polycyclic carbonates and/or polycyclic ethers, permeate through an overcoat layer, as will be described in further detail herein. It should be realized that for any of Schemes 1-8, where appropriate, such reactions can be performed at or below atmospheric pressure.

For some embodiments of the present invention, the polycarbonate polymer can encompass one or more monomer units derived from polycyclic diol monomer D. At least partial depolymerization of such polycarbonate polymers in the presence of an acid, and optionally with elevated temperature, can result in the formation of one or more polycyclic carbonate and/or polycyclic ether depolymerization units represented by the following Formulae D-DU-1 and D-DU-2, respectively.

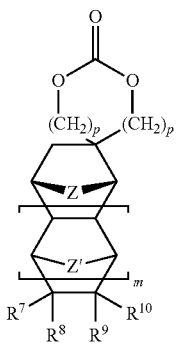

D-DU-1

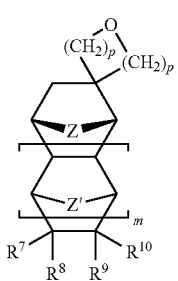

D-DU-2

With some embodiments, for each of Formulae D-DU-1 and D-DU-2, at least one p is at least 1. Vaporized depolymerization units represented by Formulae D-DU-1 and D-DU-2 can permeate through an overcoat layer, as will be described in further detail herein.

Photoacid generators that can be included in the sacrificial composition can be selected from, for example, halonium salts and/or sulfonium salts. Examples of photoacid generators that can be included in sacrificial composition embodiments according to the present invention include, but are not limited to: 4-methylphenyl[4-(1-methylethyl)phenyl]iodonium tetrakis(pentafluorophenyl)borate; bis(4-tert-butylphenyl)iodonium triflate; di(4-tert-butyl)phenyliodonium bis (perfluoromethanesulfonyl)imide; di(4-tert-butylphenyl) iodonium tris(perfluoromethanesulfonyl)methide; tris(4-tert-butylphenyl)sulfonium tetrakis(pentafluorophenyl)borate; tris(4-tert-butylphenyl)sulfonium hexafluorophosphate; triphenylsulfonium hexafluoroantimonate; triphenylsulfonium bis(perfluoromethanesulfonyl)imide; triphenylsulfonium tris(perfluoromethanesulfonyl)methide; tris[4-[(4-acetylphenyl)thio]phenyl]sulfonium tris((trifluoromethyl) sulfonyl)methanide (trade designation, GSID-26-1); triphenylsulfonium tris[(trifluoromethyl)sulfonyl]methanide (trade designation, TPS-C1); triphenylsulfonium 4,4,5,5,6,6-hexafluorodihydro-4H-1,3,2-dithiazine-1,1,3,3-tetraoxide (trade designation, TPS-N3); and combinations of two or more thereof. GSID-26-1 is commercially available from BASF Corporation. TPS-C1 and TPS-N3 are commercially available from DayChem Laboratories, Inc.

Thermal acid generators that can be included in sacrificial polymer composition embodiments according to the present invention include, but are not limited to: thermal acid generators that include a cation selected from ammonium, pyridinium, halonium, such as but not limited to iodonium, and sulfonium, and a weakly coordinating anion; N-sulfoximides; and combinations of two or more thereof. Examples of weakly coordinating anions include anions of strong acids, which can have pKa values of less than or equal to –2, and which can include, but are not limited to: hexafluoroarsenate $(AsF_6^-)$; hexafluoroantimonate $(SbF_6^-)$; hexafluorophosphate $(PF_6^-)$; perfluoroalkyl sulfonates, such as, trifluoromethane sulfonate $(CF_3SO_3^-)$, perfluorobutyl sulfonate $(C_4F_9SO_3^-)$, and perfluorooctyl sulfonate $(C_8F_{17}SO_3^-)$; bis (perfluoroalkylsulfonyl)imide anions, such as, bis(trifluormethylsulfonyl)imide anion, $(CF_3SO_2)_2N^-$; tris(perfluoroalkylsulfonyl)methides, such as, tris (trifluoromethylsulfonyl)methide, $(CF_3-SO_2)_3C^-$; tetrakis (pentafluorophenyl)borate, $(C_6F_5)_4B^-$; tetrakis(3,5-perfluoroalkyl-phenyl)borates, such as, tetrakis(3,5-trifluoromethyl-phenyl)borate, $(3,5-(CF_3)_2C_6H_3)_4B^-$; and combinations of two or more thereof.

Ammonium salts from which the thermal acid generator can be selected, can be represented by the following general formula TAG-1, $$R^{14}R^{15}R^{16}R^{17}N^+(A^-) \quad \text{TAG-1}$$

With reference to formula TAG-1, $R^{14}R^{15}R^{16}R^{17}N^+$ represents an ammonium cation in which $R^{14}$, $R^{15}$, $R^{16}$ and $R^{17}$ are each independently selected from hydrogen and hydrocarbyl. In some embodiments no more than one of $R^{14}$, $R^{15}$, $R^{16}$ and $R^{17}$ is selected from hydrogen. In some embodiments, each of $R^{14}$, $R^{15}$, $R^{16}$ and $R^{17}$ are independently selected from hydrocarbyl, and none of $R^{14}$, $R^{15}$, $R^{16}$ and $R^{17}$ are hydrogen. The hydrocarbyls from which each $R^{14}$, $R^{15}$, $R^{16}$ and $R^{17}$ can be independently selected include those classes and examples as described previously herein. The symbol K of formula TAG-1 represents a weakly coordinating anion, which can be selected from those classes and examples as described previously herein.

With further reference to formula TAG-1, at least one of $R^{14}$, $R^{15}$, $R^{16}$ and $R^{17}$ includes an ether group represented by $-O-R^{25}$, where $R^{25}$ is a hydrocarbyl group. For some embodiments, $R^{14}$ and $R^{15}$ are each methyl ($-CH_3$), $R^{16}$ is phenyl ($-C_6H_5$) and $R^{17}$ is 4-methoxybenzyl

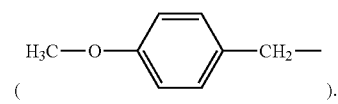

Pyridinium salts from which the thermal acid generator can be selected, can be represented by the following general formula TAG-2,

TAG-2

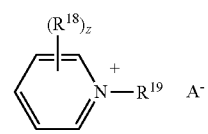

With reference to formula TAG-2, $(R^{18})_zC_5H_{(5-z)}N^{+-}R^{19}$ represents a pyridinium cation, in which $R^{18}$, if present, is independently selected for each z from hydrocarbyl, $R^{19}$ is independently selected from hydrocarbyl or hydrogen, and z is from 0 to 5, such as 0, 1, 2, 3, 4 or 5. The hydrocarbyls from which each of $R^{18}$ and $R^{19}$ can be independently selected include those classes and examples as described previously herein. The symbol A' of formula TAG-2 represents a weakly coordinating anion, which can be selected from those classes and examples as described previously herein.

N-sulfoximides from which the thermal acid generator can be selected include, but are not limited to, those represented by the following general formula TAG-3,

TAG-3

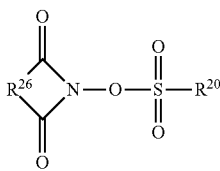

With formula TAG-3 $R^{26}$ is a hydrocarbyl linking group having at least two adjacent carbons, at least two adjacent carbons of $R^{26}$ optionally having bonded thereto a fused ring selected from non-aromatic rings, polycyclic rings and aromatic rings, and $R^{20}$ is selected from halohydrocarbyl and perhalocarbyl. Examples of N-sulfoximides from which the thermal acid generator can be selected include, but are not limited to, those represented by the following general formulae TAG-4 through TAG-8.

TAG-4

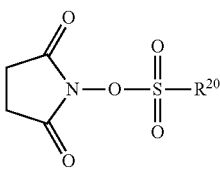

TAG-5

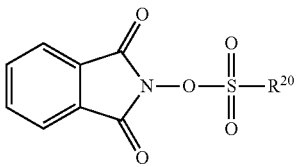

TAG-6

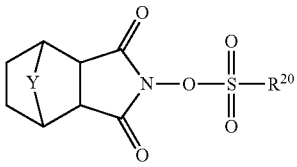

TAG-7

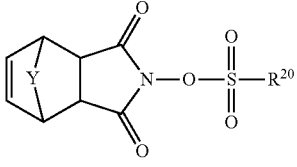

TAG-8

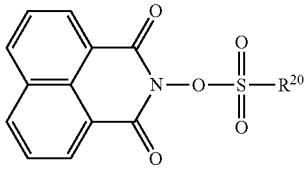

With reference to general formulae TAG-3 through TAG-8, $R^{20}$ in each case independently represents a halohydrocarbyl group. In an embodiment, $R^{20}$ of general formulae TAG-3 through TAG-8 independently represents a perhalocarbyl group, such as but not limited to perfluoromethyl, perfluoroethyl, perfluoropropyl, perfluorobutyl, perfluoropentyl, perfluorohexyl, perfluoroheptyl and perfluorooctyl. In an embodiment, $R^{20}$ of general formulae TAG-3 through TAG-8 is trifluoromethyl.

With reference to general formulae TAG-6 and TAG-7, Y in each case is independently selected from —$CH_2$—, —$CH_2$— $CH_2$— and —O—. For some embodiments, Y of general formulae TAG-6 and TAG-7 is in each case independently selected from —$CH_2$— and —O—.

Halonium and sulfonium cations from which the cations of the thermal acid generator can be selected include those known to the skilled artisan. Typically, halonium cations, such as but not limited to iodonium, are substituted with two aryl groups, such as but not limited to phenyl or substituted phenyl groups, such as but not limited to 4-tert-butylphenyl. Sulfonium cations are typically substituted with three aryl groups, such as but not limited to phenyl or substituted phenyl groups, such as but not limited to 4-tert-butylphenyl. Examples of halonium and sulfonium cations include, but are not limited to, those recited previously herein with regard to the photoacid generator, such as but not limited to bis(4-tert-butylphenyl)iodonium and triphenylsulfonium.

Sulfonium salts from which the thermal acid generator can be selected include, but are not limited to, those represented by the following general formula TAG-9.

TAG-9

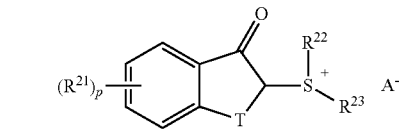

With reference to general formula TAG-9, $R^{21}$ can independently for each p be selected from a halo group, a hydrocarbyl group, or $R^{24}$—O—, where $R^{24}$ is a hydrocarbyl group, and p is from 0 to 4, such as 0, 1, 2, 3 or 4. The groups $R^{22}$ and $R^{23}$ of general formula TAG-9 can each be independently selected from hydrocarbyl, or can together form a ring, such as but not limited to a 5 or 6 membered ring. For example, $R^{22}$ and $R^{23}$ can each be independently selected from methyl, ethyl, cyclopentyl, cyclohexyl and 2-norbornyl. The T group of general formula TAG-9 can be selected from —$CH_2$—, —$C_2H_4$— or —$CH_2$—O—. The symbol $A^-$ of formula TAG-9 represents a weakly coordinating anion, which can be selected from those classes and examples as described previously herein.

For some embodiments according to the present invention, the polycarbonate polymer can be present in the sacrificial polymer composition in an amount of from 1 to 99.5 percent by weight, or 1 to 75 percent by weight, or 1 to 60 percent by weight, based on the total weight of the sacrificial polymer composition. The balance of percent weights is made up by the carrier solvent, photoacid generator and/or thermal acid generator, and optional components including, but not limited to, optional antioxidant, optional antioxidant synergist, optional co-solvent, and/or optional fluxing agent, such as formic acid.

For some embodiments according to the present invention, the photoacid generator and/or the thermal acid generator can each independently be present in the sacrificial polymer composition in amounts of from 0.5 to 6 percent by weight, or from 0.75 to 4 percent by weight, or from 1 to 3 percent by weight, based on the total weight of the sacrificial polymer composition.

For some embodiments according to the present invention, the sacrificial polymer composition can optionally further include one or more solvents. Solvent can be present in an amount of from, for example, 10 to 99 percent by weight, or 40 to 90 percent by weight, or 50 to 80 percent by weight, based on the total weight of the sacrificial polymer composition. Examples of solvents that can be included in the sacrificial polymer composition include, but are not limited to, acetonitrile, acetophenone, alpha-angelicalactone, anisole, gamma-butyrolactone, butyl acetate, cyclohexylbenzene, cyclohexanone, cyclopentanone, decahydronaphthalene, diethylene glycol dimethyl ether, N,N-dimethylacetamide, N,N-dimethyl formamide, ethyl 3-ethoxypropionate, ethyl lactate, 2-heptanone, methyl isobutyl ketone, mesitylene, 2-methoxyethyl ether, 1-methyl-2-pyrrolidinone, 2-methyltetrahydrofuran, methyl tetrahydrofurfuryl ether, gamma-octanoic lactone, propylene carbonate, propylene glycol monomethyl ether acetate, propylene glycol monomethyl ether, 1,2,3,4-tetrahydronaphthalene, and combinations thereof.

For some embodiments according to the present invention, the sacrificial polymer composition can be a photodefinable sacrificial polymer composition which is generally a positive-tone material. The photodefinable sacrificial polymer composition is typically applied in the form of a coating over a substrate, such as, a silicon chip or wafer to form a layer or film thereon. Typically, after forming such layer, the composition is image-wise exposed to actinic radiation of an appropriate wavelength and energy. In the case of a positive tone photodefinable sacrificial polymer composition, those portions exposed to actinic light passing through the photomask are removed during a development step, including but not limited to solvent washing or thermal decomposition, and the unexposed portions are retained on the substrate.

The photomask can be a gray scale photomask. The gray scale photomask encodes an optical density profile into the underlying photodefinable sacrificial polymer composition, and thereby defines a three-dimensional photodefined structure therein. Actinic light passing through the gray scale photomask typically penetrates at variable depths into the underlying photodefinable sacrificial polymer composition, thereby resulting in the formation of three-dimensional structures in the subsequently developed coating.

The photosensitive composition embodiments of the present invention generally encompass a photoacid generator, as has been described previously herein. As discussed previously herein, upon exposure to actinic radiation of an appropriate wavelength and energy, the photoacid generator generates an acid that causes at least partial depolymerization of the sacrificial polycarbonate polymer. The result of such depolymerization being a lowering of the decomposition temperature of such exposed regions, while those portions that are not exposed are not depolymerized and retain the polymer's original decomposition temperature. Generally such depolymerization also increases the solubility of exposed regions, as compared to unexposed regions, thus allowing for a dissolution based pattern development process to be employed.

As discussed previously herein with regard to polycarbonate polymer embodiments in accordance with the present invention, sacrificial polymer composition embodiments according to the present invention can be characterized with regard to the temperature at which the polymer depolymerizes or decomposes. This temperature can be referred to as a depolymerization temperature or a decomposition temperature of the sacrificial polymer. Such temperature can be quantified with regard to the $T_{d50}$ decomposition temperatures as described previously herein.

In further accordance with embodiments of the present invention, there is also provided a method of forming a structure. The structure forming method encompasses forming a three-dimensional structure on a surface of a substrate, where the three-dimensional structure typically includes a sacrificial polymer composition as described above. An overcoat layer is then applied over the three-dimensional structure. Where such overcoat layer is essentially transparent to the appropriate wavelength of radiation that can activate the photoacid generator, the an exposure to such light can be used to activate such acid generator, however, as many photoacid generators are also thermally activated, generally the substrate having the aforementioned three-dimensional structures is heated to an elevated temperature sufficient to cause depolymerization of the sacrificial polymer and decomposition of the products of such depolymerization. Such a process resulting in the forming of a three-dimensional space interposed between the overcoat layer and the substrate where ever a three-dimensional structure of such sacrificial polymer had resided. Such space the result of the conversion of the at least partially depolymerized polymer and its depolymerization products into gaseous components that permeate through the overcoat layer. Where such overcoat layer is essentially opaque, the aforementioned three-dimensional structures are not exposed to a light source and are decomposed directly by heating to an appropriate elevated temperature. The elevated temperature being less than a decomposition temperature of the overcoat layer and substrate.

The three-dimensional structures and the corresponding three-dimensional spaces can each independently have any suitable dimensions, such as heights, lengths and/or widths. The three-dimensional structures and the corresponding three-dimensional spaces can each independently have: a height of from 0.01 to 200 micrometers; a width of from 0.01 to 10,000 micrometers; and a length of from 0.01 micrometers to 100 meters. A plurality of three-dimensional structures/three-dimensional spaces, such as but not limited to a plurality of interconnected three-dimensional structures/three-dimensional spaces, can be formed in methods according to embodiments of the present invention, so as to result in larger and/or more intricate three-dimensional structures/three-dimensional spaces, which can include multiple bends and/or curves in the x-, y-, and/or z-planes.

The overcoat layer can have any suitable thickness, provided it possesses the property of allowing any decomposition products of the sacrificial polymer to permeate therethrough. Typically, the overcoat layer has a thickness of from 1 to 500 micrometers, or from 2 to 300 micrometers, or from 5 to 100 micrometers.

In some sacrificial polymer composition embodiments in accordance with the present invention both a photoacid generator and a thermal acid generator are present. For such embodiments the thermal acid generator is provided to ensure decomposition of three-dimensional structures formed from such sacrificial polymer compositions upon heating to an effective elevated temperature, without the need for an exposure step after such structures are over-coated. Such elevated temperature being from 50° C. to 450° C. for some embodiments, from 80° C. to 250° C. for some other embodiments and from 70° C. to 150° C. for still other embodiments.

In accordance with further embodiments of the present invention, there is provided a method of temporarily bonding a first substrate and a second substrate together. The temporary bonding method encompasses forming a multilayered structure that includes the first substrate, the second substrate, and a temporary bonding layer interposed between the first substrate and the second substrate and applying an effective amount of pressure and/or heat to fixably couple the first substrate to the second substrate. The temporary bonding layer including a sacrificial polymer composition embodiments of the present invention, as described above. Such temporary bonding layer can alternatively be referred to as a temporary adhesive layer.

To decouple or separate the first and second substrates after fixably coupling such substrates, the acid generator of the sacrificial polymer composition is activated, thereby generating an acid which, at least partially depolymerizes the polycarbonate polymer resulting in the lowering of the polymer's molecular weight, thereby at least partially degrading the temporary bonding layer. As a result of this degrading of the bonding layer, the substrates can be effectively separated from one another via any appropriate and effective process, for example by a slide-off or wedge-off debonding process. While such decoupling generally leaves residue of the bonding layer on one or both substrates, advantageously the depolymerized polymer residues are readily removed by one or both of (1) heating the substrates to an elevated temperature sufficient to forming gaseous products of the decomposition of such depolymerized polymer residue and (2) rinsing such substrates with appropriate aqueous and/or organic solvents. As before, the elevated temperature at which such depolymerization is conducted, is less than a decomposition temperature of the first substrate and less than a decomposition temperature of the second substrate.

The temporary bonding layer can be applied in the form of a coating or film to a surface either one or both substrates prior to bringing the substrates together to sandwich the bonding layer and form the multilayered structure. The temporary bonding layer can be applied to such surface(s) using any appropriate coating method, including, but not limited to those described previously herein. The first and second substrates, with the temporary bonding layer interposed therebetween can be subjected to any appropriate process (e.g. wafer thinning or planarization) as a multilayered structure and then subsequently debonded by either the aforementioned wedge-off or slide-off processes.

Sacrificial polymer composition embodiments in accordance with the present invention can optionally include a crosslinking agent that is thermally and/or photonically activated. The crosslinking agent forms a three-dimensional crosslink network within the sacrificial polymer composition that can result in an increased polymer decomposition temperature. Such cross-linked polymers are then useful for the fabrication of various microelectronic devices where such an increased decomposition temperature is advantageous (e.g. MEMS devices).

The first and second substrates can each be independently selected from any suitable materials, such as, but not limited to: metals, such as but not limited to copper, aluminum, steel, and metal alloys; inorganic materials, such as but not limited to silicon dioxide, silicon nitride, and aluminum oxide; organic materials, such as but not limited to organic polymers, such as but not limited to crosslinked organic polymer compositions; and combinations of two or more thereof. While temporarily bonded to each other, the first and/or second substrates are typically modified by methods including, but not limited to, machining, such as but not limited to, chemical mechanical polishing or planarization. In particular, the first surface of the first substrate and/or the second surface of the second substrate are modified. For some embodiments, the second substrate is a die, and the first substrate is a semiconductor wafer. If the semiconductor wafer/first substrate is subjected to a wafer thinning process, the active surface of the semiconductor wafer corresponds to the second surface of the first substrate, and is in facing opposition to the first surface of the second substrate. If the semiconductor wafer/first substrate is subjected to a wafer planarization process, the active surface of the semiconductor wafer corresponds to the first surface of the first substrate, and accordingly faces away from the second substrate.

The sacrificial polymer compositions, polycarbonate polymers and methods in accordance with embodiments of the present invention can be used in or in conjunction with numerous applications including, but not limited to: microelectronics, such as but not limited to microprocessor chips, communication chips, and optoelectronic chips; microfluidics; sensors; and analytical devices, such as but not limited to microchromatographic devices.

The following examples are for illustrative purposes and are not intended to limit the invention in any way. Ratios of repeating units incorporated into the polymer backbones are given in molar weight percent; where glass transition data ($T_g$) is provided such data was determined by differential scanning calorimetry at a heating rate of 10° C./minute; where thermal decomposition data is provided, such data, typically the $T_{d5}$, $T_{d50}$ and $T_{d95}$ values, were determined by thermogravimetric analysis at a heating rate of 10° C./minute and where molecular weights are provided, unless otherwise noted such were determined by gel permeation chromatograph (GPC) using a polystyrene standard.

EXAMPLES

Polycarbonate polymers according to embodiments of the present invention were prepared in accordance with the synthetic procedures described in the following Polymerization Examples 1-12. Properties of such polycarbonate polymers are summarized in the tables included therewith. As shown in Composition Examples A-F, the polymers of Polymerization Examples 1-4 and 8 were used to prepare sacrificial polymer compositions according to embodiments of the present invention. Film Evaluation Examples 1-7 demonstrate the properties of films formed from the aforementioned composition embodiments.

Polymerization Example 1 cis-exo-2,3-Norbornanedimethanol and
cis-endo-2,3-Norbornanedimethanol

To an appropriately sized and equipped multi-necked reaction vessel, were added 22.5 grams of cis-exo-2,3-norbornanedimethanol (144 mmol), 15.0 grams of cis-endo-2,3-norbornanedimethanol (96 mmol), 51.3 grams of diphenyl carbonate (240 mmol), and 12 milligrams of lithium hydride (1.5 mmol). The contents of the vessel were heated to and held at 120° C. under a nitrogen sweep for a period of time sufficient to form a reaction solution and then held at that temperature for 2 hours, under nitrogen, with constant stirring. The pressure of the reaction vessel was then reduced, isothermally, to 10 kPa and stirring continued for an additional hour. Then the pressure of the vessel was further reduced, isothermally, to 0.5 kPa, and stirred for an additional 1.5 hours, followed by increasing the temperature of the reaction solution to 180° C. and maintaining that temperature, with stirring for another 1.5 hours. The contents of the reaction vessel were then cooled to room temperature, tetrahydrofuran (800 mL) added with stirring and the resulting solution filtered. The filtrate was then added dropwise to 8 liters of a 9:1 methanol:water solution causing precipitation of the desired polymer. After isolating the precipitate and washing it with an additional 4 liters of a 9:1 methanol:water solution, the polymer was dried to constant weight. 30.7 grams of polymer were obtained. The polymer yield was 70%, its molecular weight ($M_w$), was 41,000 and polydispersity index (PDI) was 1.70.

Polymerization Example 2

1,3-Cyclohexanediol and cis-exo-2,3-Norbornanedimethanol

The procedure used in Example 1 was followed except that the reaction vessel was charged with 20.5 grams of 1,3-cyclohexanediol (176 mmoles (TCI America, Portland, Oreg.)); 15.5 grams of cis-exo-2,3-norbornanedimethanol (99 mmoles); 56.6 grams of diphenyl carbonate (264 mmoles); and 13.2 mg of lithium hydride (1.7 mmoles). 28.1 grams of polymer was obtained in a yield of 69%. The polymer was found to have a $M_y$, of 47,000, and a PDI of 1.75.

Polymerization Example 3

1,3-Cyclohexanediol and cis-endo-2,3-Norbornanedimethanol

The procedure used in Example 1 was followed except that the reaction vessel was charged with 19.2 grams of 1,3-cyclohexanediol (165 mmoles, TCI America); 14.5 grams of cis-endo-2,3-norbornanedimethanol (93 mmol); 53 grams of diphenyl carbonate (248 mmol); and 10.1 mg of lithium hydride (1.3 mmol). 28.7 grams of polymer were obtained in a yield of 76 percent. The polymer $M_w$ was 38 k, with a PDI of 1.61.

The properties of the polycarbonates obtained from Polymerization Examples 1-3 are summarized below in Tables 1 and 2. In Table 2, the column "End Ph" is the chain-end phenyl group percent mole values indicating the theoretical amount of phenol, based on the initial amount of diphenyl carbonate raw material charged and not removed during polymerization; the column "Mole %" provides values determined by $^1$H NMR analysis, and indicate the percent of monomer units in the polymers derived from cis-exo- or cis-endo-2,3-norbornanedimethanol monomer, as indicated; and the column "Solubility" is a qualitative representation as to whether a target resin content (RC, 20 wt %) of the polymer was soluble or insoluble in the indicated solvent, where "A" refers to anisole and "G" refers to gamma-butyrolactone.

TABLE 1

| Ex. # | % Yld | Mw | PDI | Tg °C. | $T_{d5}$ °C. | $T_{d50}$ °C. | $T_{d95}$ °C. |
|---|---|---|---|---|---|---|---|
| 1 | 70 | 41,000 | 1.70 | 89 | 279 | 291 | 298 |
| 2 | 68 | 47,000 | 1.75 | 112 | 262 | 285 | 309 |
| 3 | 74 | 38,000 | 1.61 | 117 | 269 | 293 | 315 |

TABLE 2

| Example | End Ph (a) (%) | Mole % (b) (Empirical) | Solubility (c) RC = 20% |
|---|---|---|---|
| 1 | 10 | exo = 59 | A: soluble<br>G: insoluble |
| 2 | 18 | exo = 41 | A: soluble<br>G: soluble |
| 3 | 17 | endo = 41 | A: soluble<br>G: soluble |

Polymerization Example 4 cis-exo-2,3-Norbornanedimethanol

The procedure used in Example 1 was followed except that the reaction vessel was charged with 25.0 g (160 mmol) of cis-exo-2,3-norbornane dimethanol and 34.3 g (185 mmol) of diphenyl carbonate and 6.4 mg (0.80 mmol) of lithium hydride. After initial polymer precipitation, the material was redissolved in tetrahydrofuran and precipitated once more into pure methanol. After filtration and drying in a dynamic vacuum oven, 23.5 g white polymer was obtained. Polymer properties are summarized as follow: $M_w$=72 k, PDI=3.0, $T_g$=85° C., $T_{d50}$=313° C.

Polymerization Example 5

5-exo-Phenyl-cis-endo-2,3-Norbornanedimethanol

The procedure used in Example 1 was followed except that the reaction vessel was charged with 25.0 g (108 mmol) of 5-exo-phenyl-cis-endo-2,3-norbornanedimethanol and 23.1 g (108 mmol) of diphenyl carbonate and 58.0 mg (0.55 mmol) of sodium carbonate. Polymer solution in tetrahydrofuran was dropwise added to pure methanol during precipitation. After filtration and drying in a dynamic vacuum oven, 19.6 g white polymer was obtained. Polymer properties are summarized as follow: $M_w$=63 k, PDI=2.0, $T_g$=114° C., $T_{d50}$=321° C.

Polymerization Example 6

5-exo-Phenyl-cis-exo-2,3-Norbornanedimethanol homopolymer

The procedure used in Example 1 was followed except that the reaction vessel was charged with 10.0 g (43 mmol) of 5-exo-phenyl-cis-exo-2,3-norbornanedimethanol and 9.2 g (43 mmol) of diphenyl carbonate and 1.7 mg (0.22 mmol) of lithium hydride. Polymer solution in a mixture of methylene chloride and tetrahydrofuran was dropwise added to pure methanol during precipitation. After filtration and drying in a dynamic vacuum oven, 9.1 g white polymer was obtained. Polymer properties are summarized as follow: $M_w$=49 k, PDI=2.0, $T_g$=115° C., $T_{d50}$=284° C.

Polymerization Example 7 cis-Bicyclo[2.2.2]octane-2,3-dimethanol homopolymer

The procedure used in Example 1 was followed except that the reaction vessel was charged with 10 g (58.7 mmol) of cis-bicyclo[2.2.2]octane-2,3-dimethanol and 12.6 g (58.7 mmol) of diphenyl carbonate and 4.2 mg (0.53 mmol) of lithium hydride. Polymer solution in a mixture of methylene chloride and tetrahydrofuran was dropwise added to a 9:1 methanol:water mixture during precipitation. After filtration and drying in a dynamic vacuum oven, 9.5 g white polymer was obtained. Polymer properties are summarized as follow: $M_w$=74 k, PDI=2.1, $T_g$=103° C., $T_{d50}$=266° C.

Polymerization Example 8 trans-2,3-Norbornanedimethanol homopolymer

The procedure used in Example 1 was followed except that the reaction vessel was charged with 70.0 g (448 mmol) of trans-2,3-norbornane dimethanol and 96.5 g (450 mmol) of diphenyl carbonate and 238 mg (2.24 mmol) of sodium carbonate. Polymer solution in tetrahydrofuran was dropwise added to pure methanol during precipitation. After filtration and drying in a dynamic vacuum oven, 75.4 g white polymer was obtained. Polymer properties are summarized as follow: $M_w$=177 k, PDI=2.1, $T_g$=81° C., $T_{d50}$=360° C.

Polymerization Example 9

Isosorbide Homopolymer

The procedure used in Example 1 was followed except that the reaction vessel was charged with 102.3 g of isosorbide (0.7 mol, Cargill Inc., Minneapolis, Minn.); 149.95 g of diphenyl carbonate (0.7 mol); and 3.0 mg of cesium carbonate (0.01 mmol). The crude polymer was dissolved in gamma-butyrolactone (GBL). About 119 g polycarbonate polymer was obtained after precipitation into 7:3 isopropanol:water, filtration, and vacuum drying. Polymer properties are summarized as follow: $M_w$=38.5 k, PDI=2.61, $T_g$=167° C., $T_{d50}$=376° C.

Polymerization Example 10

Isosorbide and trans-2,3-Norbornanedimethanol

The following were added to a 250 mL round flask charged with a suitably sized magnetic stirrer: 13.17 g of isosorbide (90 mmol, Cargill Inc.), 14.09 g of trans-2,3-norbornanedimethanol (90 mmol), 38.63 g of diphenyl carbonate (180 mmol), and 95.6 mg of sodium carbonate (9.0 mmol). The flask was evacuated to 1.3 kPa and refilled with nitrogen three times. The contents were kept under nitrogen when the flask was immersed into an oil bath at 120° C. The reaction was kept at 120° C. for 2 hours under a nitrogen sweep. The contents of the flask were then subjected to a reduced pressure of 10 kPa at 120° C. for 1 hour. Subsequently, the oil bath temperature was gradually increased from 120 to 180° C. at 10 kPa, during which a majority of phenol is distilled over and collected in a liquid nitrogen cooled trap. The pressure was gradually reduced to 0.7 kPa and the reaction was held at 180° C. for an additional 2 hours. The contents of the flask were cooled to room temperature and dissolved in a suitable amount of tetrahydrofuran, such as 150 mL, with orbit shaking. The solution was further diluted to 500 mL with tetrahydrofuran and filtered. The filtered solution was dropwise added to 5 liters of methanol. The white polymer was collected by filtration and dried in a vacuum oven (70° C., 29.4 inches water vacuum) for 18 hours. Dry polymer weight was 30.2 g. Polymer properties are summarized as follow: $M_w$=32 k, PDI=1.94, $T_g$=116° C., $T_{d50}$=372° C.

Polymerization Example 11

Isosorbide and 1,4-Cyclohexanedimethanol

The procedure used in Example 10 was followed except that the reaction vessel was charged with 29.04 g of isosorbide (199 mmol, Cargill Inc.), 28.7 g of 1,4-cyclohexanedimethanol (199 mmol), 85.2 g of diphenyl carbonate (398 mmol), and 211 mg of sodium carbonate (19.9 mmol). Dry polymer weight was 65.1 g. Polymer properties are summarized as follow: $M_w$=72 k, PDI=2.84, $T_g$=110° C., $T_{d50}$=373° C.

Polymerization Example 12

Cyclic Norbornane Spirocarbonate Homopolymer sec-Butyllithium (0.21 mL, 1.4 M in cyclohexanone) was added to spiro[bi-cyclo[2.2.1]heptane-2,5'-[1,3]dioxan]-2'-one (15 g, 82.3 mmol) in toluene (200 mL) at 0° C. under a nitrogen blanket. The reaction mixture was stirred at 0° C. for 5 hours and then gradually allowed to warm to room temperature. Stirring was continued for an additional 12 hours at room temperature after which the polymer was precipitated from methanol, and dried under vacuum to give 9 g of a white polymer. Polymer $M_w$ was determined to be 32 k with a PDI of 1.63.

Thermogravimetric Analysis Examples

Sacrificial polymer compositions, according to embodiments in accordance with the present invention, were using polymers made in the manner of each of Polymerization Examples 1-4, and 8. Each composition included 2.0 pphr of the photoacid generator tris[4-[(4-acetylphenyl)thio]phenyl] sulfonium tris((trifluoromethyl)sulfonyl)methanide, (GSID-26-1 from BASF Corp.). For Examples B and C the casting solvent was GBL, for Example E cyclohexanone and for the others, anisole.

Each composition was then applied to two four inch silicon wafers in the manner described above to create a polymer coating, and one of such wafers exposed to UV radiation (365 nm, 1 J/cm$^2$), the other wafer being unexposed. A sample of each polymer (unformulated), and of coating from each exposed and unexposed wafer was then subjected to thermogravimetric analysis. For Examples A-C, $T_{d10}$, $T_{d50}$ and $T_{d90}$ are reported in ° C. using a heating rate of 132° C./10 minutes and for Examples D-F, $T_{d5}$, $T_{d50}$ and $T_{d95}$ are reported in ° C. using a heating rate of 10° C./minute.

TGA Example A

The thermogravimetric analysis of the polycarbonate polymer of Polymerization Example 1, and a sacrificial polymer composition thereof as described above, is summarized in Table 3, below, and a graphical representation of the thermogravimetric plots from which decomposition temperatures were derived is provided in FIG. 1 where line 1 is the polymer, line 2 the unexposed coating and line 3 the exposed coating.

TABLE 3

|  | $T_{d10}$ | $T_{d50}$ | $T_{d90}$ |
|---|---|---|---|
| Polymer Alone | 296 | 314 | 328 |
| Unexposed | 296 | 304 | 310 |
| Exposed | 112 | 163 | 194 |

TGA Example B

Figure 2:
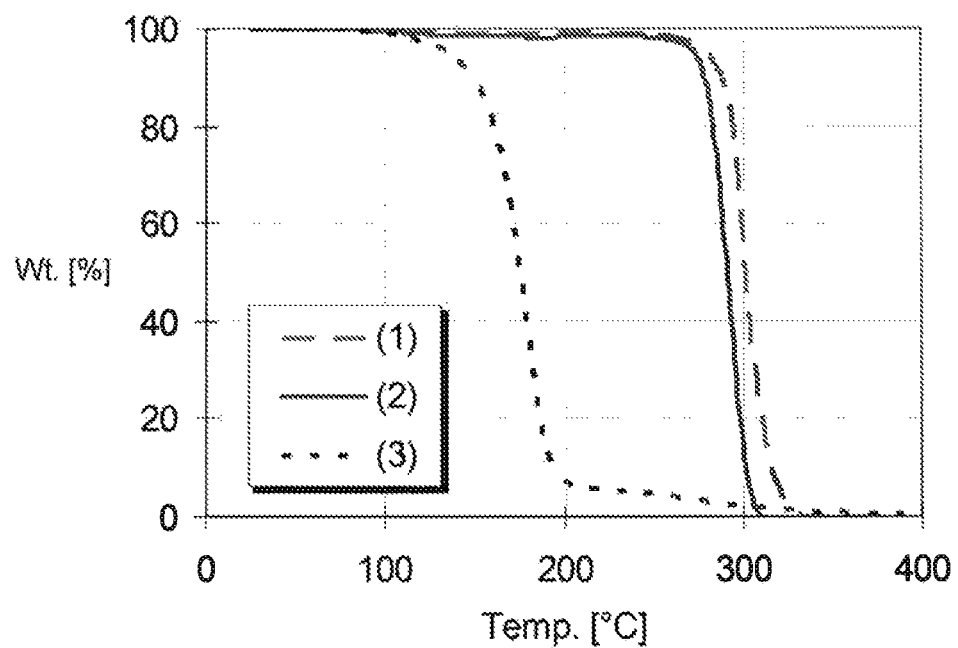

The thermogravimetric analysis of the polycarbonate polymer of Polymerization Example 2, and a sacrificial polymer composition thereof as described above, is summarized in Table 4, below, and a graphical representation of the thermogravimetric plots from which decomposition temperatures were derived is provided in FIG. 2 where line 1 is the polymer, line 2 the unexposed coating and line 3 the exposed coating.

TABLE 4

|  | $T_{d10}$ | $T_{d50}$ | $T_{d90}$ |
|---|---|---|---|
| Polymer Alone | 288 | 301 | 316 |
| Unexposed | 279 | 291 | 301 |
| Exposed | 149 | 175 | 194 |

TGA Example C

Figure 3:
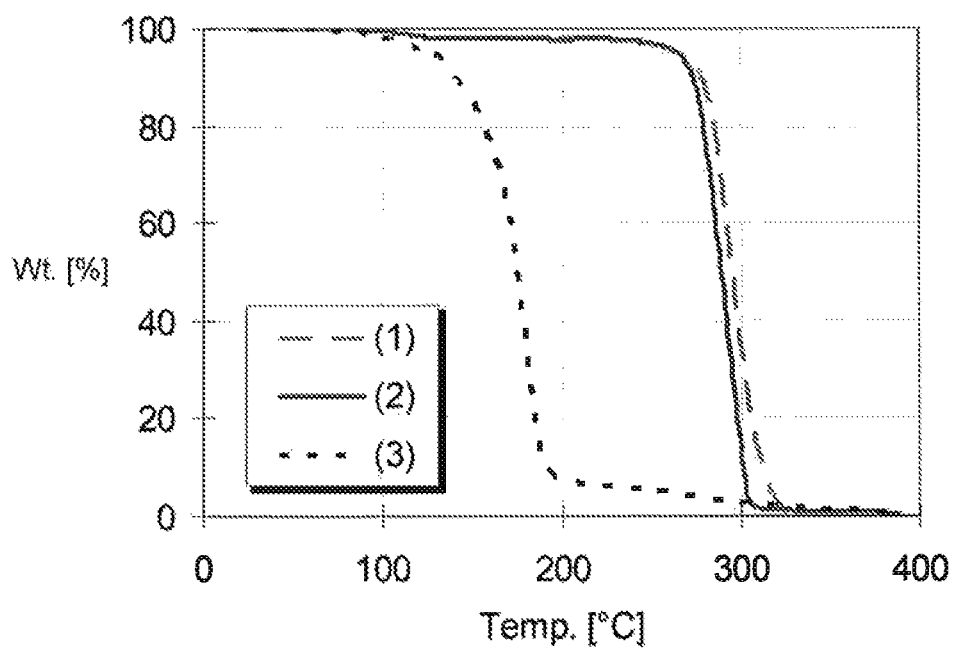

The thermogravimetric analysis of the polycarbonate polymer of Polymerization Example 3, and a sacrificial polymer composition thereof as described above, is summarized in Table 5, below, and a graphical representation of the thermogravimetric plots from which decomposition temperatures were derived is provided in FIG. 3 where line 1 is the polymer, line 2 the unexposed coating and line 3 the exposed coating.

TABLE 5

|  | $T_{d10}$ | $T_{d50}$ | $T_{d90}$ |
|---|---|---|---|
| Polymer Alone | 278 | 295 | 312 |
| Unexposed | 273 | 289 | 301 |
| Exposed | 141 | 175 | 191 |

TGA Example D

The thermogravimetric analysis of the polycarbonate polymer of Polymerization Example 4, and a sacrificial polymer composition thereof as described above, is summarized below in Table 6.

TABLE 6

|  | $T_{d5}$ | $T_{d50}$ | $T_{d95}$ |
|---|---|---|---|
| Polymer Alone | 264 | 286 | 298 |
| Unexposed | 261 | 286 | 304 |
| Exposed | 102 | 160 | 225 |

TGA Example E

The thermogravimetric analysis of the polycarbonate polymer of Polymerization Example 8 with $M_w$=127K, and a sacrificial polymer composition as described above, except that 0.5 pphr GSID-26-1 was added to such composition, is summarized below in Table 7.

TABLE 7

|  | $T_{d5}$ | $T_{d50}$ | $T_{d95}$ |
|---|---|---|---|
| Polymer Alone | 297 | 348 | 375 |
| Unexposed | 314 | 332 | 341 |
| Exposed | 242 | 294 | 314 |

TGA Example F

The thermogravimetric analysis of the polycarbonate polymer of Polymerization Example 1, and a sacrificial polymer composition as described above, except that 5 pphr Rhodorsil® PI2074 and 1.5 pphr CPTX were added to such composition, is summarized in Table 8.

TABLE 8

|  | $T_{d5}$ | $T_{d50}$ | $T_{d95}$ |
|---|---|---|---|
| Polymer Alone | 262 | 290 | 310 |
| Unexposed | 194 | 201 | 221 |
| Exposed | 96 | 165 | 221 |

A comparison of the data of Example F to that of Example A, demonstrates that Rhodorsil PI2074 can act as a thermal acid generator as well as a photo acid generator while GSID-26-1 is only a photo acid generator. Thus, the data in Table 8 for the polymer alone is consistent with that from Table 1, while the Table 8 data for both the unexposed and exposed coatings each show a significant lowering of the decomposition temperatures. Heating the polymer composition in Example A essentially reproduces the TGA curve of Polymer Example 1 alone while heating the polymer composition in Example F generates an acid which decomposes Polymer Example 1 at lower temperatures and shifts the TGA curve accordingly. Exposing polymer composition in Example F further reduces the polymer decomposition temperature as both the PAG and TAG effects are combined.

TGA Example G

A polymer composition was formulated from a polymer made in the manner of Example 8 ($M_w$=127 k) and an appropriate amount of cyclohexanone. The composition was spin-coated onto a four-inch silicon substrate and then baked at 120° C. for 5 min. The wafer was split into halves, one of which was exposed to 365 nm UV radiation at 1 J/cm², the other half left unexposed. Both halves were then baked at 200° C. for 5 min. A sample of the film was peeled from each, and analyzed by GPC and TGA. The $M_w$ determined from the exposed sample was 122 k, which is within experimental error to the $M_w$ determined from the unexposed sample (127 k). $T_{d5}$ data determined from the both samples were within 1° C. of the expected 345° C.

TGA Examples H-J

A polymer composition was formulated in the manner of TGA Example G, except that 0.5 pphr of the PAG GSID-26-1 was also added to the composition. Unexposed and exposed (365 nm, 1 J/cm²) samples were prepared following procedures described in TGA Example G, and analyzed by GPC and TGA. The $M_w$ determined from the exposed sample was 12.8 k, which is significantly lower than the $M_w$ determined from the unexposed sample (124 k). The $T_{d5}$ determined from the exposed sample was 263° C., which is 69° C. lower than $T_{d5}$ determined from the unexposed sample. The same experiment was repeated with other polymers made in the manner of Polymerization Example 8, except each with, as indicated, a different $M_w$. All showed that GSID-26-1 lowered polymer decomposition temperatures after exposure to UV radiation and thermal development. A list of $M_w$ and $T_{d5}$ data obtained is summarized in Table 9, below.

TABLE 9

| Ex. # | $M_w$ (unexposed) | $M_w$ (exposed) | $T_{d5}$ (unexposed) | $T_{d5}$ (exposed) |
|---|---|---|---|---|
| G | 127k | 122k | 346 | 344 |
| H | 124k | 12.8k | 332 | 263 |
| I | 86.0k | 10.7k | 302 | 250 |
| J | 49.2k | 10.7k | 314 | 242 |

Wafer Bonding Example 1

A polymer composition was formulated from 14.99 g of trans-2,3-PNDMC polymer made in the manner of Polymerization Example 8 ($M_w$=54 k) and sufficient cyclohexanone to form 37.10 g of a composition with a resin content of 40.4%. The composition was spin-coated onto a four-inch silicon substrate and baked at 120° C. for 5 min, after which the temperature was raised to 160° C. and held at that temperature for an additional 10 min. The film thickness was measured by profilometry and found to be 40 µm. A four-inch glass wafer was then placed overlying the wafer film on silicon substrate and bonded to one another using a SB-8e substrate bonder (Suss MicroTec) set at a temperature of 150° C. with a pressure of 0.32 MPa applied for 5 minutes under vacuum ($10^{-2}$ mbar) forming a bonded wafer stack. The bonded wafer stack was visually inspected through the glass wafer and no defects observed. The bonded wafer stack remained completely free of voids after heating at 260° C. for 15 min.

Wafer Bonding Example 2

A polymer composition was formulated from 5.90 g of trans-2,3-PNDMC polymer made in the manner of Polymerization Example 8 ($M_w$=177 k) and sufficient cyclohexanone to form a 25.02 g of a composition with a resin content of 23.6%. The composition was spin-coated onto a four-inch silicon substrate and baked at 120° C. for 5 min followed by 160° C. for 10 min to yield a 25 μm thick film. A four-inch glass wafer was then placed overlying the wafer film on silicon substrate. The wafers were bonded to one another as described in Wafer Bonding Example 1 to form a bonded wafer stack, except that the temperature was set to 200° C. and the pressure set to 0.18 MPa. The bonded wafer stack was visually inspected through the glass wafer and no defects were observed. Limited voids (<5) were observed after heating at 220° C. for 15 min but no additional defects were observed after raising the temperature to 260° C. and maintaining the bonded wafer and substrate at that temperature for an additional 15 min.

Prophetic Wafer Bonding Example

A bonded wafer stack is prepared as described in Wafer Bonding Example 1 or 2, except that an effective amount of a PAG is added to the polymer composition. The wafer stack is mounted onto a DFG8540 automatic surface grinder (Disco) and thinned to a desired thickness, for example 50 μm. After thinning, the bonded wafer stack is exposed to an effective dose of UV radiation, for example 0.5 to 2 J/cm² at 365 nm, through the glass wafer The thinned wafer is debonded from the glass wafer by a slide-off method using, for example an EVG 805 wafer debonder (EV Group, Austria) at 170° C. The debonder set for a slide-off rate of from 1 to 3 mm/sec. Any residue on the debonded wafers is fully removed by agitation in mesitylene for 5 min, followed by a water rinse.

By now it should be realized that new polycarbonate polymers and sacrificial compositions containing such newly developed polycarbonate polymers have been demonstrated by the descriptions of the various Synthetic Schemes presented herein as well as via the various Polymerization Examples that have also been presented. In addition by and through the various TGA Examples provided it has been shown that the polycarbonate polymers in accordance with the present invention can be decomposed at significantly lower temperatures through the addition of an effective thermal acid generator or photo acid generator. Therefore it should be understood that polymer composition embodiments in accordance with the present invention can be prepared that can be used to form polymer films that are readily decomposed and/or depolymerized leaving little or no residue and that such films are useful for forming structures, air-gaps, as well as for forming releasable or temporary bonds.

What is claimed is:

1. A sacrificial polymer composition comprising:

a polycarbonate polymer comprising repeating units derived from at least one polycyclic 2,3-diol monomer, such monomer represented by any of Formulae A1, B1 or C1:

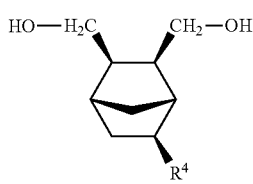

A1

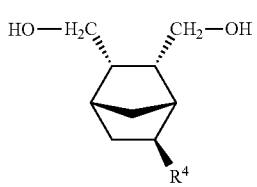

B1

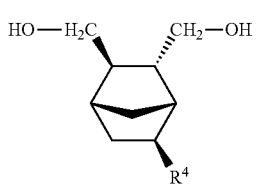

C1 where, $R^4$ is hydrogen, alkyl, cycloalkyl, heteroalkyl, heterocycloalkyl, aryl, heteroaryl and aralkyl; and an acid generator selected from p otoacid generators, thermal acid generators and combinations thereof.

2. The sacrificial polymer composition of claim 1 where said at least one monomer is represented by Formula A1.

3. The sacrificial polymer composition of claim 2 where said monomer represented by Formula A1 is selected from the group consisting of:

cis-exo-2,3-norbornanedimethanol; and 5-exo-phenyl-cis-exo-2,3-norbornanedimethanol.

4. The sacrificial polymer composition of claim 1 where said at least one monomer is represented by Formula B1.

5. The sacrificial polymer composition of claim 4 where said monomer represented by Formula B1 is selected from the group consisting of:

cis-endo-2,3-Norbornanedimethanol; and 5-exo-phenyl-cis-endo-2,3-norbornanedimethanol.

6. The sacrificial polymer composition of claim 1 where said at least one monomer is represented by Formula C1.

7. The sacrificial polymer composition of claim 6 where said monomer represented by Formula C1 is trans-2,3-norbornanedimethanol.

8. The sacrificial polymer composition of claim 1, where said repeating units of the polycarbonate polymer are further derived from at least one polycyclic diol monomer represented by additional Formulae D1, D1', E1, E1', F1 and F1':

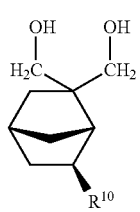

D1

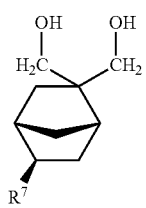

D1'

-continued

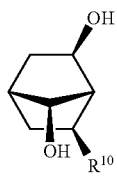 E1

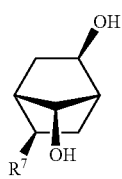 E1'

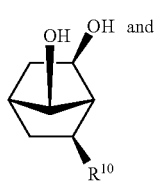 F1

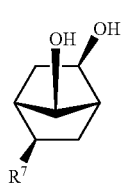 F1' where $R^7$ and $R^{10}$ are in each case independently selected from hydrogen, alkyl, cycloalkyl, heteroalkyl, heterocycloalkyl, aryl, heteroaryl and aralkyl.

9. The sacrificial polymer composition of claim 1, where said repeating units of said polycarbonate polymer are further derived from at least one additional diol monomer unit selected from diol monomers represented by Formulae I through XII,

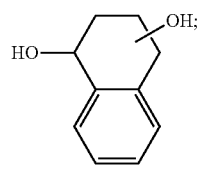 I

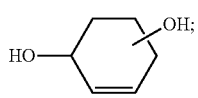 II

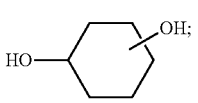 III

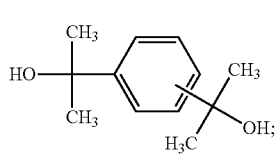 IV

-continued

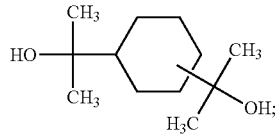 V

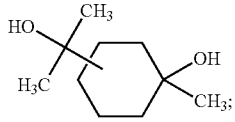 VI

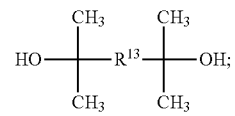 VII

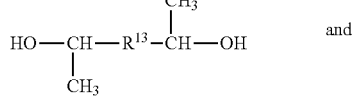 VIII

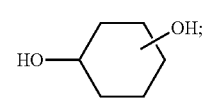 IX $$HO-\underset{CH_3}{\overset{CH_3}{C}}-R^{13}-\underset{CH_3}{\overset{CH_3}{C}}-OH;\quad X$$

$$HO-\underset{CH_3}{CH}-R^{13}-\underset{CH_3}{CH}-OH \quad \text{and} \quad XI$$

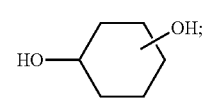 XII where $R^{13}$ is independently selected from $C_1$-$C_6$ alkyl.

10. The sacrificial polymer composition of claim 9, where said at least one additional diol monomer unit is selected from diol monomers. represented by Formulae III, V, VI and XII:

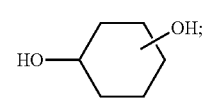 III

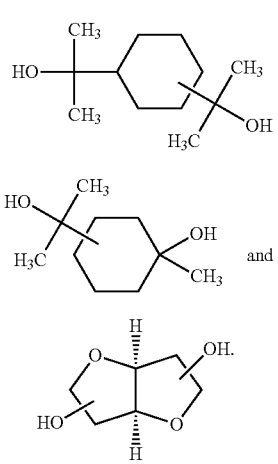

11. The sacrificial polymer composition of claim 1, where said repeating units of said polycarbonate polymer is derived from one or more of the monomers selected from the group consisting of:
cis-exo-2,3-norbornanedimethanol;
5-exo-phenyl-cis-exo-2,3-norbornanedimethanol;
cis-endo-2,3-Norbornanedimethanol;
5-exo-phenyl-cis-endo-2,3-norbornanedimethanol;
trans-2,3-norbornanedimethanol; and
spiro[bi-cyclo[2.2.1]heptane-2,5'-[1,3]dioxa]-2'-one.

12. The sacrificial polymer composition of claim 10, where said repeating units of said polycarbonate polymer is further derived from one or more of the monomers selected from the group consisting of:
1,3-cyclohexanediol; and
isosorbide.

13. The sacrificial polymer composition of claim 1, where said photoacid generator is selected from halonium salts, sulfonium salts and combinations thereof.

14. The sacrificial polymer composition of claim 1, where said photoacid generator is selected from:
(4-methylphenyl)[4-(1-methylethyl)phenyl]iodonium tetrakis(pentafluorophenyl)borate;
bis(4-tert-butylphenyl)iodonium triflate;
di(4-tert-butylphenyl)iodonium bis(perfluoromethanesulfonyl)imide;
di(4-tert-butylphenyl)iodonium tris(perfluoromethanesulfonyl)methide;
tris(4-tert-butylphenyl)sulfonium tetrakis(pentafluorophenyl)borate;
tris(4-tert-butylphenyl)sulfonium hexafluorophosphate;
triphenylsulfonium hexafluoroantimonate;
triphenylsulfonium bis(perfluoromethanesulfonyl)imide;
triphenylsulfonium tris(perfluoromethanesulfonyl)methide;
(2-(4-methoxynaphthalen-1-yl)-2-oxoethyl)dimethylsulfonium;
bis[2-(4-methoxyphenyl)-2-oxoethyl]methylsulfonium;
tris(2-oxo-2-phenylethyl)sulfonium;
[2-oxo-2-(2-phenanthrenyl)ethyl]dimethylsulfonium; and combinations thereof.

15. The sacrificial polymer composition of claim 1, where said photoacid generator is selected from:
tris[4-[(4-acetylphenyl)thio]phenyl]sulfonium tris((trifluoromethyl)sulfonyl)methanide; and
(4-methylphenyl)[4-(1-methylethyl)phenyl]iodonium tetrakis(pentafluorophenyl)borate.

16. The sacrificial polymer composition of claim 1, where said thermal acid generator is selected from: thermal acid generators comprising a cation selected from ammonium, pyridinium, halonium and sulfonium, and a weakly coordinating anion; N-sulfoximides; and combinations thereof.

17. The sacrificial polymer composition of claim 16 where the weakly coordinating anion is selected from;
tetrakis(pentafluorophenyl)borate (FABA);
tetrakis(3,5-bis(trifluoromethyl)phenyl)borate;
trifluoromethane sulfonate ($CF_3SO_3^-$);
perfluorobutyl sulfonate ($C_4F_9SO_3^-$);
perfluorooctyl sulfonate ($C_8F_{17}SO_3^-$);
bis(trifluormethylsulfonyl)imide anion ($(CF_3SO_2)_2N^-$;
4,4,5,5,6,6-hexafluorodihydro-4H-1,3,2-dithiazine-1,1,3,3-tetraoxide;
and tris(trifluoromethylsulfonyl)methide.

18. A sacrificial polymer composition comprising:
a polycarbonate polymer comprising repeating units derived from at least one polycyclic 2,3-diol monomer of Formulae A1:

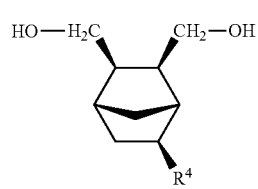

where, $R^4$ is hydrogen or phenyl; and
an acid generator selected from a photoacid generator, which is tris[4-[(4-acetylphenyl)thio]phenyl]sulfonium tris((trifluoromethyl)sulfonyl)methanide.

19. A sacrificial polymer composition comprising:
a polycarbonate polymer comprising repeating units derived from at least one polycyclic 2,3-diol monomer of Formulae B1:

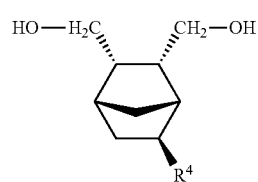

where, $R^4$ is hydrogen or phenyl; and
an acid generator selected from a photoacid generator, which is tris[4-[(4-acetylphenyl)thio]phenyl]sulfonium tris((trifluoromethyl)sulfonyl)methanide.

20. A sacrificial polymer composition comprising:
a polycarbonate polymer comprising repeating units derived from at least one polycyclic 2,3-diol monomer of Formulae C1:

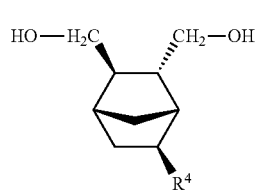
where, $R^4$ is hydrogen or phenyl; and
an acid generator selected from a photoacid generator, which is s[4-[(4-acetylphenyl)thio]phenyl]sulfonium tris((trifluoromethyl)sulfonyl)methanide.
* * * * *